US009181389B2

(12) United States Patent
Farrugia et al.

(10) Patent No.: US 9,181,389 B2
(45) Date of Patent: Nov. 10, 2015

(54) ALIZARIN-BASED POLYMER COLORANTS

(71) Applicant: Xerox Corporation, Norwalk, CT (US)

(72) Inventors: Valerie M. Farrugia, Oakville (CA); Mihaela Maria Birau, Mississauga (CA); Gabriel Iftime, Mississauga (CA); Biby Esther Abraham, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 18 days.

(21) Appl. No.: 13/898,082

(22) Filed: May 20, 2013

(65) Prior Publication Data

US 2014/0342280 A1 Nov. 20, 2014

(51) Int. Cl.

| | |
|---|---|
| ***G03G 9/00*** | (2006.01) |
| ***C08G 63/199*** | (2006.01) |
| ***G03G 9/087*** | (2006.01) |
| ***G03G 9/09*** | (2006.01) |
| ***C08G 63/133*** | (2006.01) |
| ***C08G 63/193*** | (2006.01) |

(52) U.S. Cl.

CPC ............ *C08G 63/199* (2013.01); *C08G 63/133* (2013.01); *C08G 63/193* (2013.01); *G03G 9/08755* (2013.01); *G03G 9/08795* (2013.01); *G03G 9/08797* (2013.01); *G03G 9/0912* (2013.01); *C08G 2261/344* (2013.01)

(58) Field of Classification Search

CPC ................................ G03G 9/09; C08G 63/199
USPC ................. 430/108.4; 524/592; 528/126, 427
See application file for complete search history.

(56) References Cited

U.S. PATENT DOCUMENTS

| | | | |
|---|---|---|---|
| 3,590,000 | A | 6/1971 | Palermiti et al. |
| 3,847,604 | A | 11/1974 | Hagenbach |
| 3,944,493 | A | 3/1976 | Jadwin et al. |
| 4,007,293 | A | 2/1977 | Mincer et al. |
| 4,079,014 | A | 3/1978 | Burness et al. |
| 4,298,672 | A | 11/1981 | Lu |
| 4,338,390 | A | 7/1982 | Lu |
| 4,394,430 | A | 7/1983 | Jadwin et al. |
| 4,560,635 | A | 12/1985 | Hoffend et al. |
| 4,935,326 | A | 6/1990 | Creatura et al. |
| 4,937,166 | A | 6/1990 | Creatura et al. |
| 5,004,664 | A | 4/1991 | Fuller et al. |
| 5,236,629 | A | 8/1993 | Mahabadi et al. |
| 5,278,020 | A | 1/1994 | Grushkin et al. |
| 5,290,654 | A | 3/1994 | Sacripante et al. |
| 5,302,486 | A | 4/1994 | Patel et al. |
| 5,308,734 | A | 5/1994 | Sacripante et al. |
| 5,330,874 | A | 7/1994 | Mahabadi et al. |
| 5,344,738 | A | 9/1994 | Kmiecik-Lawrynowicz et al. |
| 5,853,943 | A | 12/1998 | Cheng et al. |
| 5,959,066 | A | 9/1999 | Charbonneau et al. |
| 6,004,714 | A | 12/1999 | Ciccarelli et al. |
| 6,025,061 | A | 2/2000 | Khanarian et al. |
| 6,063,464 | A | 5/2000 | Charbonneau et al. |
| 6,107,447 | A | 8/2000 | Kreuder et al. |
| 6,190,815 | B1 | 2/2001 | Ciccarelli et al. |
| 6,214,507 | B1 | 4/2001 | Sokol et al. |
| 6,593,049 | B1 | 7/2003 | Veregin et al. |
| 6,743,559 | B2 | 6/2004 | Combes et al. |
| 6,756,176 | B2 | 6/2004 | Stegamat et al. |
| 6,830,860 | B2 | 12/2004 | Sacripante et al. |
| 7,029,817 | B2 | 4/2006 | Robinson et al. |
| 7,329,476 | B2 | 2/2008 | Sacripante et al. |
| 7,736,831 | B2 | 6/2010 | Lai et al. |
| 7,817,944 | B2 | 10/2010 | Li |
| 7,822,370 | B2 | 10/2010 | Himes |
| 2003/0082663 | A1 * | 5/2003 | Daniloff et al. ................. 435/14 |
| 2006/0216626 | A1 | 9/2006 | Sacripante et al. |
| 2007/0015075 | A1 | 1/2007 | Vijayvendran et al. |
| 2007/0027291 | A1 * | 2/2007 | Yano et al. .................... 528/271 |
| 2008/0107989 | A1 | 5/2008 | Sacripante et al. |
| 2008/0153027 | A1 | 6/2008 | Veregin et al. |
| 2008/0236446 | A1 * | 10/2008 | Zhou et al. ................. 106/31.25 |
| 2009/0047593 | A1 | 2/2009 | Vanbesien et al. |
| 2009/0155703 | A1 | 6/2009 | Sacripante et al. |
| 2012/0183896 | A1 | 7/2012 | Sacripante et al. |
| 2012/0208118 | A1 | 8/2012 | Farrugia |

OTHER PUBLICATIONS

Meng et al. Journal of Applied Polymer Science, vol. 81, 2246-2248 (2001).*

Santiago Faucher, et al., U.S. Appl. No. 13/423,851, filed Mar. 19, 2012, "Robust Resin for Solvent-Free Emulsification," not yet published, 43 pages.

Salma Falah Toosi, et al., U.S. Appl. No. 13/690,941, filed Nov. 30, 2012, "Phase Change Ink Comprising Colorants Derived From Plants and Insects," not yet published, 59 pages.

Mihaela Maria Birau, et al., U.S. Appl. No. 13/690,857, filed Nov. 30, 2012, "Modified Naturally-Derived Colorants for Phase Change Ink Applications," not yet published, 50 pages.

Salma Falah Toosi, et al., U.S. Appl. No. 13/690,898, filed Nov. 30, 2012, "Phase Change Ink Comprising Modified Naturally-Derived Colorants," not yet published, 91 pages.

Valerie M. Farrugia, et al., U.S. Appl. No. 13/718,424, filed Dec. 18, 2012, "Bio-Based Branched Resins for Toner," not yet published, 32 pages.

* cited by examiner

*Primary Examiner* — Shane Fang

(74) *Attorney, Agent, or Firm* — Marylou J. Lavoie, Esq. LLC

(57) ABSTRACT

A polymer colorant including polymer monomer units, and at least one alizarin unit which is incorporated into the polymer and which provides color to the polymer colorant and a process for preparing the polymer colorant. An article or composition containing the polymer colorant. A toner including the polymer colorant, and optionally, one or more ingredients selected from the group consisting of crystalline polyester resins, amorphous polyester resins, colorants, waxes, coagulants, mordants, and mixtures and combinations thereof. A polymer latex including an aqueous dispersion of polymer colorant, wherein the polymer colorant comprises polymer monomer units and at least one alizarin unit which is incorporated into the polymer and which provides color to the polymer colorant; and optionally, a mordant.

16 Claims, 1 Drawing Sheet

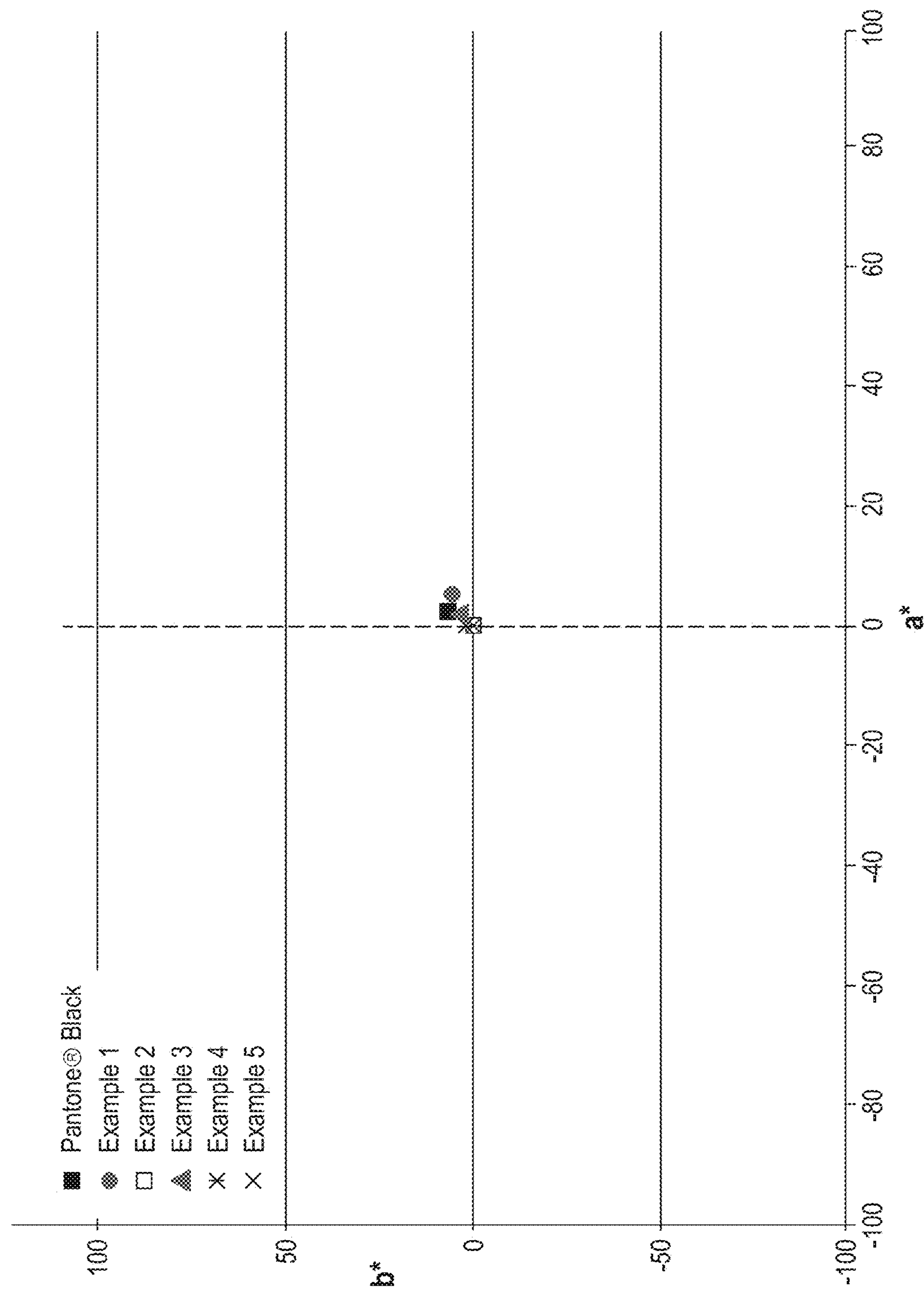
Pantone® Black
Example 1
Example 2
Example 3
Example 4
Example 5
a*
b*
-100
-80
-60
-40
-20
0
20
40
60
80
100
-50
50

ALIZARIN-BASED POLYMER COLORANTS

BACKGROUND

Disclosed herein are alizarin-based polymer colorants comprising polymer monomer units and alizarin units, compositions, latex, and toners comprising the polymer colorants, and processes for producing same. The alizarin-based polymer colorants and polymer compositions are bio-based, are naturally colored and do not need any additional colorant, dye or pigment. The polymer colorants and polymer compositions may be used for the formation of assorted articles and materials including, in embodiments, toners.

Numerous processes are within the purview of those skilled in the art for the preparation of toners. Emulsion aggregation is one such method. Emulsion aggregation toners may be used in forming print and/or electrophotographic images. Emulsion aggregation techniques may involve the formation of a polymer emulsion by heating a monomer and undertaking a batch or semi-continuous emulsion polymerization, as disclosed in, for example, U.S. Pat. No. 5,853,943, the disclosure of which is hereby incorporated by reference in its entirety. Emulsion aggregation/coalescing processes for the preparation of toners are illustrated in a number of patents, such as U.S. Pat. Nos. 5,290,654, 5,278,020, 5,308,734, 5,344,738, 6,593,049, 6,743,559, 6,756,176, 6,830,860, 7,029,817, and 7,329,476, and U.S. Patent Application Publication Nos. 2006/0216626, 2008/0107989, 2008/0107990, 2008/0236446, and 2009/0047593. The disclosures of each of the foregoing patents are hereby incorporated by reference in their entirety.

Polyester EA ultra low melt (ULM) toners have been prepared utilizing amorphous and crystalline polyester resins as illustrated, for example, in U.S. Patent Application Publication No. 2008/0153027, the disclosure of which is hereby incorporated by reference in its entirety.

Many polymeric materials utilized in the formation of toners are based upon the extraction and processing of fossil fuels, leading ultimately to increases in greenhouse gases and accumulation of non-degradable materials in the environment. Furthermore, current polyester based toners may be derived from a bisphenol a monomer, which is a known carcinogen/endocrine disruptor.

Bio-based polyester resins have been utilized to reduce the need for this carcinogenic monomer. An example, as disclosed in co-pending U.S. Patent Application Publication No. 2009/0155703, includes a toner having particles of a bio-based resin, such as, for example, a semi-crystalline biodegradable polyester resin including polyhydroxyalkanoates, wherein the toner is prepared by an emulsion aggregation process.

Most consumer goods require to be colored. Color is typically provided by pigments and dyes including colored marking materials such as toners and inks. While small molecule dyes or pigments have significant advantages, including favorable cost, ease of manufacturing, and in some cases enhanced lightfastness, they can also have disadvantages. Dispersing of pigments can be a time and energy consuming process requiring tedious selection of surfactant, synergist additives and particle size reduction experimental conditions. In addition, because of a tendency to settle, the stability of pigment dispersions can be problem over industries using colorants, including inks, paints, toners or colored extruded product parts. For example, in emulsion aggregation toner fabrication, the pigment can be added during the emulsion-aggregation process to provide color to the toner particles. Pigments can be rejected during the emulsion aggregation process and/or washing stage of the toner making process thereby changing the final color of the toner. Small molecule dyes can also have limitations. Dye migration, poor thermal and lightfastness properties are problems that can be encountered with small molecule dyes. These issues can impact a variety of industries such as plastic dishware and toys which are first compounded by polymer extrusion and then have colorant added during the article shaping. Many coloring agents soften, melt or decompose at temperatures below the melting point of the high temperature polymer used for the article and the colorants can then adhere to the extruder parts causing the final polymeric product to have inconsistent color.

While currently available colorants and toners are suitable for their intended purposes, a need remains for improved colorants. Further, a need remains for improved colored polymer compositions, latex, and toner compositions. Alternative cost-effective, environmentally friendly toners remain desirable. Furthermore, there is a need for sustainable, bio-based colorants and resin compositions and for sustainable, bio-based products. There is further a need for marking materials having increased content of bio-renewable components including sustainable colorants. There is further a need for a colorant material which provides robust colors with improved lightfastness, thermal and temporal stability and which is bio-renewable.

The appropriate components and process aspects of the each of the foregoing U.S. patents and patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is a polymer colorant comprising polymer monomer units and at least one alizarin unit which is incorporated into the polymer and which provides color to the polymer colorant.

Also described is a polymer latex comprising an aqueous dispersion of polymer colorant, wherein the polymer colorant comprises polymer monomer units and at least one alizarin unit which is incorporated into the polymer and which provides color to the polymer colorant; and optionally, a mordant.

Also described is a toner comprising a polymer colorant comprising polymer monomer units and at least one alizarin unit which is incorporated into the polymer and which provides color to the polymer; and optionally, one or more ingredients selected from the group consisting of crystalline polyester resins, amorphous polyester resins, colorants, waxes, coagulants, mordants, and mixtures and combinations thereof.

Also described is a process for preparing a polymer colorant comprising contacting at least one polymer monomer with at least one alizarin unit and polymerizing to form a polymer colorant wherein the alizarin is incorporated into the polymer and wherein the alizarin provides color to the polymer colorant; and determining the final color of the polymer colorant by one or more of the following: (a) selecting a ratio of alizarin units relative to polymer monomer units, (b) selecting type of monomer units, (c) treating alizarin with a mordant prior to polymerizing, (d) treating alizarin with a mordant during polymerizing, e) treating the polymer colorant with a mordant after polymerizing, (f) selecting a ratio of alizarin units relative to polymer monomer units and selecting type of monomer units to control interaction of the alizarin monomeric unit with the other monomers comprising the polymer colorant.

BRIEF DESCRIPTION OF THE DRAWINGS

FIG. 1 is a graph showing a* and b* of the CIE L*a*b* (CIELAB) color space for polymeric colorants of the present disclosure and comparative materials.

DETAILED DESCRIPTION

The present disclosure provides novel bio-based, eco-friendly polymeric materials suitable for various applications, including the formation of polyester-based emulsion aggregation toners. The polymer colorant comprises a polymer comprising monomer units and at least one alizarin unit which is incorporated into the polymer and which provides color to the polymer colorant. In embodiments, the polymer colorant comprises one or more alizarin units as monomeric units in a polyester structure.

The present polymer colorant provides a novel bio-based polymeric colorant consisting of a naturally derived (bio-based) coloring molecular moiety, alizarin, which is chemically bonded by ester links to bio-based monomer components to provide a permanently colored polymer structure. The colored polymer can be prepared by polymerization of the natural colorant, alizarin, with bio-based and petroleum-based monomers. In embodiments, both 100 percent bio-based polymers and partially bio-based polymers are synthesized.

The present disclosure also provides a polymer composition comprising the polymer colorant and optionally, a mordant. In embodiments, a polymer composition is provided comprising a polymer comprising polymer monomer units; and at least one alizarin unit which is incorporated into the polymer and which provides color to the polymer; and wherein the color of the polymer composition is tuned based on the selection of mole percent of alizarin based on the total mole percent of the polymer composition including alizarin and monomers.

The present disclosure also provides a toner, in embodiments, an emulsion aggregation toner, comprising a polymer comprising polymer monomer units; and at least one alizarin unit which is incorporated into the polymer and which provides color to the polymer; and optionally, one or more ingredients selected from the group consisting of crystalline polyester resins, amorphous polyester resins, colorants, waxes, coagulants, mordants, and mixtures and combinations thereof.

For emulsion aggregation toner, colorant is added during the emulsion-aggregation process to provide color to the toner particles. In embodiments, the color of the toner can be tuned by the selection of the amount of polymer colorant with respect to the total toner composition. In embodiments, additional colorants, in addition to the present polymeric colorant, can be added to provide a toner of various colors. The optional additional colorants can be dyes, pigments, or mixtures or combinations thereof. While pigments can be rejected during the emulsion aggregation process and/or washing stage of the toner making process, thereby changing the final color of the toner, the present toners comprise the present polymer colorant wherein the colorant is a part of the polymer backbone and forms a part of the toner resin itself thereby alleviating or eliminating altogether this rejection issue.

The polymeric colorant can be used for any suitable or desired application. In embodiments, the polymeric colorant can be provided in an article selected from the group consisting of toners, inks, toys, paints, fibers, machine parts, molded articles or products, extruded articles or products, and combinations thereof.

The present polymer colorants can be used in various industries, including, but not limited to, polymer extrusion of plastic dishware and toys. While previously, colorant was added during article shaping wherein many coloring agents would soften, melt, or decompose at temperatures below the melting point of the high temperature polymer and adhere to the extruder parts, causing the final polymeric product to have inconsistent color. The polymeric materials of the present disclosure, which are bio-based and possess a natural color, enable formation of colored articles wherein the color is a part of the resin material forming the article itself.

Bio-based colorants, resins, polyester compositions, or products, as used herein, in embodiments, include commercial and/or industrial products (other than food or feed) that may be composed, in whole or in significant part, of biological products or renewable domestic agricultural materials (including plant, animal, or marine materials) and/or forestry materials as defined by the U.S. Office of the Federal Environmental Executive.

Bio-based and/or Bio-renewable Colorants, Resins, and Polymers.

Polymer colorant and polymer compositions or resins in accordance with the present disclosure may include bio-based colorant or bio-based resin monomer units. In embodiments, the polymer monomer units are bio-based, wherein the alizarin is bio-renewable, or wherein both the polymer monomer units are bio-based and the alizarin is bio-renewable. As used herein, a bio-based colorant or bio-based resin or monomer unit is a colorant, a resin, a resin formulation, a monomer unit that can form a polymer, or a polymer that is derived from a biological source such as vegetable oil instead of petrochemicals.

As used herein, "bio-based," can mean a compound or product that is composed, in whole or in substantial part (e.g., between about 90% to about 100% by weight, from about 95% to about 100% by weight, from about 98% to about 100% by weight), of biological products or renewable materials (including plant, animal and marine materials) or forestry materials. Bio-based materials are biodegradable.

As used herein, "biodegradable," generally relates to susceptibility of a compound or material to alteration by microbial action or to inherent lability which limits environmental presence or persistence. Bio-based compounds are generally biodegradable. Environmental persistence may be measured as the time necessary for a certain degree of degradation or change, such as, about 50% degradation, over a period of a day, week, month or a minimal number of years, such as, about two years, about three years and so on.

As renewable materials with low environmental impact, their principal advantages include that they reduce reliance on finite resources of petrochemicals, and they sequester carbon from the atmosphere. A bio-based polymer colorant includes, in embodiments, for example, a polymer wherein at least a portion of the polymer is derived from a natural biological material, such as animal, plant, combinations thereof, and the like. In embodiments, a bio-based polymer colorant includes a polymer comprising polyester monomer units and at least one alizarin unit which is incorporated into the polymer and which provides color to the polymer colorant, and wherein one or more of the polyester monomer units or the alizarin units or both the polyester monomer units and the alizarin units are derived from a natural biological material.

Polymer.

The polymer colorant herein can include polymers comprising any suitable or desired monomer units which monomer units are polymerized with the alizarin unit to form the polymer colorant. That is, the polymer colorant includes one or more monomer units and one or more alizarin units which are polymerized to provide the polymer colorant.

In embodiments, the polymer monomer units are selected from the group consisting of polyester monomer units, polyamide monomer units, polyurethane monomer units, and combinations thereof.

In embodiments, the polymer colorant herein can include any suitable or desired polyester including liner and branched polyesters. In embodiments, the monomer units provide a polyester which can be an amorphous polyester, a crystalline polyester, or a combination thereof.

As used herein, a, "linear," polymer forms a long chain without branches or cross-linked structures. The molecular chains of a linear polymer may intertwine but the forces tending to hold the molecules together are physical rather than chemical and thus can be weakened by energy applied in the form of, for example, heat.

As used herein, a, "branched," polymer comprises a chain having division points that connect, for example, covalently, sites within a chain and/or between two or more chains, where branching can occur by replacement of a substituent, e.g., a hydrogen atom, on a monomer subunit, by another covalently bonded chain of that or another polymer. As such, the forces holding the molecules together are less susceptible to weakening by energy applied in the form of, for example, heat (e.g., show greater resistance to change in viscosity as compared to a linear polymer of similar Mw over the same temperature range; viscosity plateau). As provided herein, the branched polymers of interest have shorter chains to provide branching interactions but without the propensity to form networks and gels.

As noted above, any suitable or desired monomers can be used in the polymeric colorants herein. In embodiments, the monomers can form an amorphous resin, a crystalline resin, or a mixture or combination thereof. In further embodiments, the resin can be a polyester resin, including the resins described in U.S. Pat. Nos. 6,593,049 and 6,756,176, which are each hereby incorporated by reference herein in their entireties. Suitable resins can also include a mixture of an amorphous polyester resin and a crystalline polyester resin as described in U.S. Pat. No. 6,830,860, which is hereby incorporated by reference herein in its entirety.

In specific embodiments, the resin is polyester. In certain embodiments, the resin is amorphous polyester, crystalline polyester, or a mixture thereof.

For forming a crystalline polyester, one or more polyol branching monomers can be reacted with a diacid in the presence of an optional catalyst and a further organic diol suitable for forming the crystalline resin including aliphatic diols having from about 2 to about 36 carbon atoms, such as 1,2-ethanediol, 1,3-propanediol, 1,4-butanediol, 1,5-pentanediol, 2,2-dimethylpropane-1,3-diol, 1,6-hexanediol, 1,7-heptanediol, 1,8-octanediol, 1,9-nonanediol, 1,10-decanediol, 1,12-dodecanediol, and mixtures and combinations thereof, including their structural isomers. The aliphatic diol may be present in any suitable or desired amount, such as from about 25 to about 60 mole percent, or from about 25 to about 55 mole percent, or from about 25 to about 53 mole percent of the resin. In embodiments, a third diol can be selected from the above-described diols in an amount of from about 0 to about 25 mole percent, or from about 1 to about 10 mole percent of the resin.

Examples of organic diacids or diesters including vinyl diacids or vinyl diesters that can be selected for the preparation of the crystalline resin include oxalic acid, succinic acid, glutaric acid, adipic acid, suberic acid, azelaic acid, sebacic acid, fumaric acid, dimethyl fumarate, dimethyl itaconate, cis-1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid, malonic acid, mesaconic acid, a diester or anhydride thereof, and mixtures and combinations thereof. The organic diacid can be present in any suitable or desired amount, in embodiments, from about 25 to about 60 mole percent, or from about 25 to about 52 mole percent, or from about 25 to about 50 mole percent. In embodiments, a second diacid can be selected from the above-described diacids and can be present in an amount of from about 0 to about 25 mole percent of the resin.

For forming crystalline polyester, one or more polyacid branching monomers can be reacted with a diol in the presence of an optional catalyst and a further organic diacid or diester. The components can be selected in any suitable or desired ratio. In embodiments, the branching monomer can be provided in an amount of from about 0.1 to about 15 mole percent, or from about 1 to about 10 mole percent, or from about 2 to about 5 mole percent, and, in embodiments, a second branching monomer can be selected in any suitable or desired amount, in embodiments, from about 0 to about 10 mole percent, or from about 0.1 to about 10 mole percent of the robust resin.

Examples of diacids or diesters suitable for use in forming the resin herein include vinyl diacids or vinyl diesters used for the preparation of amorphous polyester resins including dicarboxylic acids or diesters such as terephthalic acid, phthalic acid, isophthalic acid, fumaric acid, trimellitic acid, dimethyl fumarate, dimethyl itaconate, cis-1,4-diacetoxy-2-butene, diethyl fumarate, diethyl maleate, maleic acid, succinic acid, itaconic acid, succinic acid, succinic anhydride, dodecylsuccinic acid, dodecylsuccinic anhydride, lutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethladipate, dimethyl dodecylsuccinate, and mixtures and combinations thereof.

The organic diacid or diester may be present in any suitable or desired amount, such as from about 35 to about 60 mole percent of the resin, or from about 42 to about 52 mole percent of the resin, or from about 45 to about 50 mole percent of the resin.

Examples of diols which may be used to prepared the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cycloheaxanediol, diethylene glycol, bis(2-hydroxyethyl)oxide, dipropylene glycol, dibutylene, and mixtures and combinations thereof.

The organic diol can be present in any suitable or desired amount, such as from about 35 to about 60 mole percent of the resin, or from about 42 to about 55 mole percent of the resin, or from about 45 to about 53 mole percent of the resin.

In certain embodiments, the polyester can be a bio-based polyester. The bio-based polyester can be a bio-based amorphous polyester, a bio-based crystalline polyester, or a combination of bio-based amorphous polyester and bio-based crystalline polyester.

Examples of amorphous bio-based polymeric resins which may be utilized include polyesters derived from monomers including a fatty dimer acid or diol of soya oil, D-isosorbide, and/or amino acids such as L-tyrosine and glutamic acid as described in U.S. Pat. Nos. 5,959,066, 6,025,061, 6,063,464, and 6,107,447, and U.S. Patent Application Publication Nos. 2008/0145775 and 2007/0015075, the disclosures of each of which are hereby incorporated by reference in their entirety.

In embodiments, suitable bio-based polymeric resins which may be utilized include polyesters derived from monomers including a fatty dimer acid or diol, D-isosorbide, naphthalene dicarboxylate, a dicarboxylic acid such as, for example, azelaic acid, succinic acid, cyclohexanedioic acid, naphthalene dicarboxylic acid, terephthalic acid, glutamic acid, and combinations thereof, and optionally ethylene glycol, propylene glycol and 1,3-propanediol. Combinations of the foregoing, as well as combinations excluding some of the above monomers, may be utilized, in embodiments.

Polyester polymers may be obtained by polycondensation of a cyclic polyalcohol, which optionally may be functionalized, and a polyacid, optionally in the presence of one or more catalysts. In embodiments, the polyester polymers disclosed herein are made from materials that are readily obtainable from renewable sources, that is, are bio-based, and are biodegradable.

The polyester selected for embodiments herein can be a polyester resin as described in U.S. patent application Ser. No. 13/718,424, filed Dec. 18, 2012, of Valerie Farrugia et al., which is hereby incorporated by reference herein in its entirety. In embodiments, the polyester can be a bio-based, branched polyester resin comprising (i) the condensation product of (a) a hydroxyl donor; (b) a cyclic polyhydroxyl acceptor; and (c) an optional catalyst, and (ii) a polyacid, wherein said bio-based, branched polyester resin is greater than about 90% bio-based.

Polyester polymers may be obtained by polycondensation of a cyclic polyalcohol, which optionally may be functionalized, and a polyacid, optionally in the presence of one or more catalysts. The polyester polymers disclosed herein can be prepared in whole or in part from materials that are readily obtainable from renewable sources, that is, are bio-based, and are biodegradable.

Examples of cyclic hydroxyl acceptors are rosin or resin acids, such as, abietic acid (also known as abietinic acid or sylvic acid), that occur widely in trees. Abietic acid is the primary component of resin acid, is the primary irritant in pine wood and resin, is isolated from rosin and is the most abundant of several closely related carboxylic acids that constitute most of rosin, the solid portion of the oleoresin of coniferous trees. Abietic acid can be produced together with oxalic acid, fumaric acid and malic acid in submerged culture anaerobic fermentation by various types of bacteria and molds. Other rosin acids include, but are not limited to, neoabietic acid, dehydroabietic acid, palustric acid, levopimaric acid, pimaric acid, isopimaric acid and combinations thereof, which are isolated from rosin or are available commercially.

Polyols other than those obtained by reacting a cyclic polyhydroxyl acceptor and a hydroxyl donor can be used in the esterification reaction.

The resulting cyclic polyol is combined with a polyacid in an esterification reaction as known in the art. The ratio of cyclic polyol to polyacid generally is one, however, relative amounts that deviate from that even ratio can be used as a design choice. The reaction conditions and reactants are as known in the art. The reaction can include a catalyst.

Suitable polyester monomers and polyacid monomers for the esterification reaction include those which are bio-based and include known polycarboxylic acids, such as, oxalic acid, malonic acid, succinic acid, glutaric acid, adipic acid, pimelic acid, suberic acid, azelaic acid, sebacic acid, undecanedioic acid, maleic acid, fumaric acid, glutaconic acid, traumatic acid, muconic acid, glutinic acid, diabolic acids, methylene succinic acid and so on, isomers thereof, other dioic acid and so on, citric acid, isocitric acid, aconitic acid, trimesic acid, mellitic acid, tricarballylic acid, trimesic acid, isomers thereof, other trioic acids and so on. Essentially any compound that comprises at least two carboxylic acids and is biodegradable, or not, can be used in the practice of the instant subject matter.

Polycondensation catalysts include tetraalkyl titanates, such as, titanium (iv) butoxide or titanium (iv) iso-propoxide; dialkyltin oxides such as dibutyltin oxide; tetraalkyltins such as dibutyltin dilaurate; dialkyltin oxide hydroxides such as butyltin oxide hydroxide, tetraisopropyl orthotitanate, tetrabutyl orthotitanate monobutyl tin oxide, dibutyl tin oxide; aluminum alkoxides; alkyl zinc; dialkyl zinc; zinc oxide; stannous oxide; butyl(hydroxyl)stannanone; tetraethylammonium iodine; and combinations thereof. The catalysts may be used in amounts of from about 0.001 mol % to about 0.55 mol % based on the starting polyacid/polyester and cyclic polyol used to generate the branched polyester resin. In embodiments, the catalysts may be FASCAT® 4100, FASCAT® 4350, FASCAT® 9100.

Polycondensation temperatures range from about 150° C. to about 250° C., from about 185° C. to about 215° C. Excess polyol may be removed under generated vacuum. Total reaction time may range from about 1 to about 32 hours.

In embodiments, the polyester is a bio-based, branched polyester resin comprising (i) the polycondensation product of (a) glycerine carbonate and/or glycerol; and (b) a rosin acid selected from the group consisting of abietic acid, neoabietic acid, palustric acid, levopimaric acid, dihydroabietic acid, pimaric acid, isopimaric acid and combinations thereof; and (ii) a polyacid selected from the group consisting of succinic acid, fumaric acid, maleic acid, itaconic acid, dodecylsuccinic acid, glutaric acid, adipic acid, pimelic acid, suberic acid and azelaic acid.

In a specific embodiments, the polyester is 1-decyl-12-methyl dodecanedioate of the formula

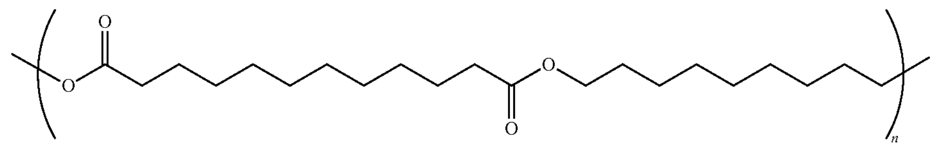

wherein n is an integer from 1 to 1,000 which can be prepared according to the following reaction scheme.

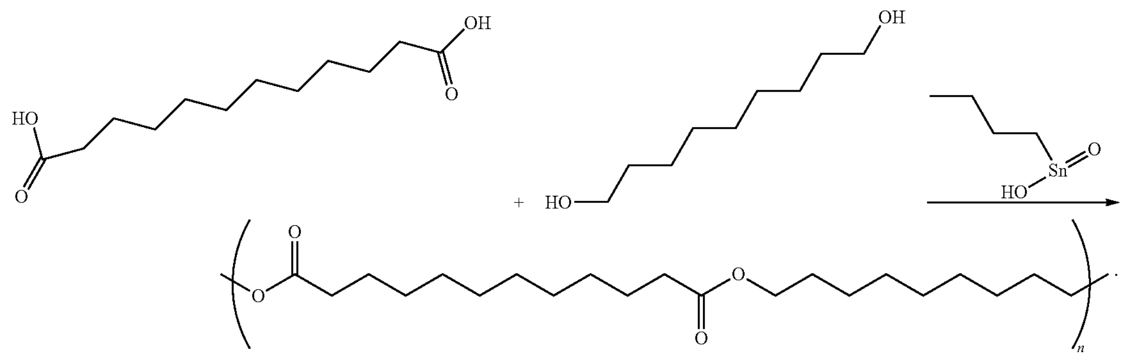

The polyester selected for embodiments herein can further be a polyester resin as described in U.S. patent application Ser. No. 13/423,851, filed Mar. 19, 2012, of Santiago Faucher et al., which is hereby incorporated by reference herein in its entirety. In embodiments, the polyester can be a branched polyester comprising a compound of the formula:

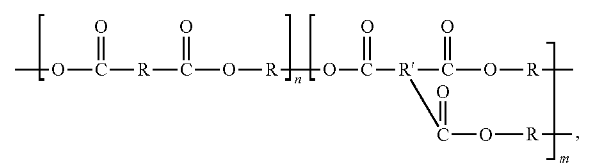

or

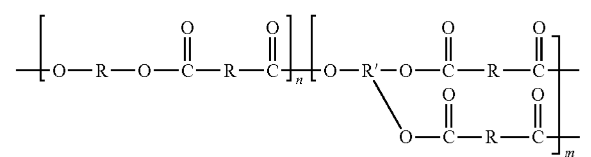

wherein R is an alkylene group, and wherein the alkylene group can be selected from linear and branched, saturated and unsaturated, cyclic and acyclic, and substituted and unsubstituted alkylene groups, and wherein heteroatoms either may or may not be present in the alkylene group;

wherein R' is an alkylene group, and wherein the alkylene group can be selected from linear and branched, saturated and unsaturated, cyclic and acyclic, and substituted and unsubstituted alkylene groups, and wherein heteroatoms either may or may not be present in the alkylene group;

wherein all carbonyl carbons adjacent to R' are separated by at least two atoms if the two atoms are separated by a single bond; or wherein all carbonyl carbons adjacent to R' are separated by at least 3 atoms covalently linked in series;

wherein m is an integer from about 1 to about 1,000; and wherein n is an integer from about 1 to about 1,000.

The branched polyester can be prepared by a process for preparing a branched polyester suitable for use in solvent-free emulsification processes, wherein the branched polyester contains at least one of alcohol-derived branching sites or acid-derived branching sites that limit or prevent altogether degradation of the branched polyester during solvent-free emulsification processes such that the branched polyester exhibits less than about 20 percent weight average molecular weight degradation following solvent-free emulsification, comprising contacting at least one branching agent with at least one diacid, at least one diester, or a mixture or combination thereof, and reacting same to produce a branched polyester; wherein the at least one branching agent is sufficient to provide at least one of alcohol-derived branching sites or acid-derived branching sites to the polyester that limit or prevent altogether degradation of the polyester during solvent-free emulsification processes such that the branched polyester exhibits less than about 20 percent molecular weight degradation following solvent-free emulsification.

Any suitable or desired polyamide monomers may be selected in embodiments herein. Non-limiting examples of polyamides include poly(ethylene-adipamide), poly(propylene-adipamide), poly(butylenes-adipamide), poly(pentylene-adipamide), poly(hexylene-adipamide), poly(octylene-adipamide), poly(ethylene-succinimide), and poly (propylene-sebecamide).

Any suitable or desired polyurethane can be selected in embodiments here. Polyurethane is a polymer comprising urethane groups of the formula

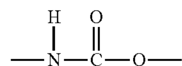

In particular embodiments, the polyurethane is an aliphatic polyurethane. In further embodiments, the polyurethane is a single component polyester based polyurethane elastomer. Such materials are commercially available from Dow Chemical as Monothane™. In some embodiments, the polyurethane elastomer can be cured at room temperature. Polyurethane is a low cost material and thus use of that elastomer in the present embodiments help reduce manufacturing costs.

Colorant.

The polymer colorant herein includes at least one alizarin unit which is polymerized with at least one monomer to form a polymer colorant thus incorporating the alizarin into the polymer colorant as part of the polymer colorant itself to form a colored polymer wherein the alizarin provides the color to the polymer. Alizarin is a natural, bio-renewable colorant that can be extracted from the dried roots of the *Rubia* plant (Madder genus). Alizarin is a prominent dye derived from a madder plant and is named after the "alizari" roots of the *Rubia tinctorum* plant. Alizarin is an organic compound that has been used throughout history as a red dye, principally for dyeing textile fabrics. In embodiments herein, alizarin is polymerized with carboxylated monomers exploiting the fact that alizarin has two hydroxyl groups substituted at the 1 and 2 positions.

Alizarin is referenced in the Color Index as C.I. Mordant Red 11 (listed as C.I. 58000) and variants thereof are known as "ancient reds." In embodiments, the alizarin herein is selected from the group consisting of 1,3-dihydroxyanthraquinone, 1,4-dihydroxyanthraquinone, 1,5-dihydroxyanthraquinone, 1,6-dihydroxyanthraquinone, 1,7-dihydroxyanthraquinone, 1,8-dihydroxyanthraquinone, 2,3-dihydroxyanthraquinon, 2,6-dihydroxyanthraquinone, 2,7-dihydroxyanthraquinone, and mixtures and combinations thereof.

In embodiments, the polymer colorant unit herein comprises alizarin of the formula

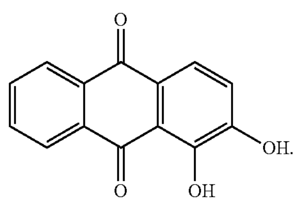 [SMILES: O=C1c2ccccc2C(=O)c2c1ccc(O)c2O]

The alizarin polymer colorant unit herein can be derived from Alizarin purpurin (referenced as C.I. Natural Red 8 and C.I. Natural Red 16 and listed as C.I. 75410 and also known as Indigo Red) of the formula

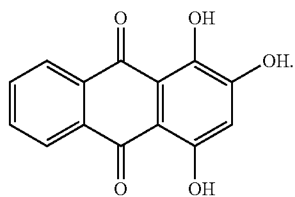 [SMILES: O=C1c2ccccc2C(=O)c2c(O)c(O)cc(O)c21]

The color of the polymer colorant herein can be tuned by selecting a desired mole percent of alizarin based on the total mole percent of the total polymer units comprising the polymer colorant including the polymer monomer units and alizarin colorant units.

In a specific embodiment, the polymer colorant herein comprises one or more alizarin units as monomeric units in a polyester structure.

In embodiments, the interaction of the alizarin monomeric unit with the other monomers comprising the polymer colorant influences the color of the formed polymer colorant. Thus, the present disclosure contemplates selecting the type of monomer or monomers of the polymer colorant, selecting the amount of monomer or monomers, selecting the amount of alizarin units, or a combination thereof so as to tune or determine the final color of the polymer colorant. That is, in embodiments, the resulting color of the polymer colorant herein is different from the color of alizarin itself. In embodiments, the polymer colorant is pink, brown, grey or black. In certain embodiments, a polymer colorant herein comprises alizarin and one or more monomers selected such that the polymer colorant is black or black-brown. For example, the polymer colorant herein can comprise at least one alizarin unit and at least one monomer selected from the group consisting of 1,6-hexanediol, succinic acid, dimethyl terephthalate, 1,12-dodecanedioic acid, propanediol, isophthalic acid, azelaic acid, isosorbide, and combinations thereof, to provide a polymer colorant that is black or black-brown.

In embodiments, the polymer colorant can be combined with a mordant. The mordant can be selected to vary the color of the final polymer colorant. For example, the polymer colorant can be combined with a mordant to vary the color of the polymer colorant from pink to dark brown or black. In embodiments, the alizarin can be treated, such as with alum/alkali, such that the water-soluble form becomes a solid, insoluble alizarin pigment. In embodiments, the alizarin can be treated with metal salt, such as iron or tin, to provide a madder-based pigment of various colors depending on the salt selected. The alizarin can be treated before, during, or after polymerization with the monomer or monomers to form the polymer colorant. Alternately, a mordant or other material can be provided with the formed polymer colorant to affect the color of an article produced therewith.

Any suitable or desired mordant can be selected for use with the polymer colorants herein. In embodiments, the mordant can be selected from the group consisting of trivalent chromium complexes, chromium (III) potassium sulfate, metallic hydroxides, sodium chloride, tannic acid, alum, urine, and salts of aluminum, chromium, copper, iron, iodine, potassium, sodium, and tin, and mixtures and combinations thereof.

Thus, a polymer composition herein can comprise the present polymer colorant and a mordant or combination of mordants. Further, a toner herein can comprise the present polymer colorant and a mordant or combination of mordants.

Alizarin in and of itself is a colorant or dye of a prominent red, crimson, or purple. The present polymer colorant has a final color that is tuned by the selection of one or more of the following: amount of alizarin units present in the polymer colorant, type and amount of monomers present in the polymer colorant, treatment of the alizarin with a mordant before preparing the polymer colorant, treatment of the alizarin with a mordant during preparing the polymer colorant, treatment of the polymer colorant after preparing the polymer colorant, provision of a mordant in a composition, toner, latex, product, article or other material prepared with the polymer colorant (that is, the alizarin may or may not be treated before being polymerized with monomer(s) to form the polymer colorant, but a mordant is optionally provided when the prepared polymer colorant is subsequently used), such that the final color of the polymer colorant or article prepared therewith is achieved based on the selection of the aforementioned. In embodiments, the polymer colorant has a final color that is determined by one or more of the following: amount of alizarin units, type of monomer units, amount of monomer units; treatment of alizarin with a mordant, interaction of the alizarin monomeric unit with the other monomers comprising the polymer colorant.

In embodiments, the present disclosure provides a polymer colorant containing alizarin units polymerized with monomer units so that the alizarin units are in the backbone of the resulting polymer colorant and wherein the color of the resulting polymer colorant is different from that of alizarin itself. In embodiments, the polymer colorant herein comprises polymer monomer units and at least one alizarin unit which provides color to the polymer colorant, wherein the color of the polymer colorant is pink, brown, grey, or black.

The polymer colorant herein can be prepared by any suitable or desired process. In embodiments, the process for preparing a polymer colorant comprises contacting at least one polymer monomer with at least one alizarin unit and polymerizing to form a polymer colorant wherein the alizarin is incorporated into the polymer and wherein the alizarin provides color to the polymer colorant; and determining the final color of the polymer colorant by one or more of the following: (a) selecting a ratio of alizarin units relative to polymer monomer units, (b) selecting type of monomer units, (c) treating alizarin with a mordant prior to polymerizing, (d) treating alizarin with a mordant during polymerizing, e) treating the polymer colorant with a mordant after polymerizing, (f) selecting a ratio of alizarin units relative to polymer monomer units and selecting type of monomer units to control interaction of the alizarin monomeric unit with the other monomers comprising the polymer colorant.

Polyester Composition.

In embodiments, a polyester composition is provided comprising a polymer comprising polyester monomer units; and at least one alizarin unit which is incorporated into the polymer and which provides color to the polymer; and wherein the color of the polyester composition is tuned based on the selection of mole percent of alizarin based on the total mole percent of the polyester composition.

The polymer can contain the polyester monomer units and the alizarin units in any suitable or desired amount. In embodiments, the proportions of polyester monomer units and alizarin units are tailored to tune the color of the polyester composition. In embodiments, the polymer contains from about 0.005 to about 0.80 mole percent alizarin or from about 0.02 to about 0.5 mole percent alizarin based on the total mole percent of the total polyester composition components.

Colored Article.

The polymer colorant or polymer composition herein possesses a color of its own, and thus any article produced utilizing such a colorant or polymer composition may not require additional pigments, dyes, and/or colorants to obtain a colored article. In embodiments, such a polymer colorant, polymer composition, or article produced therefrom may be referred to herein, in embodiments, as having a "natural color" and/or "naturally colored" and/or "inherently colored."

In embodiments, any suitable or desired article herein can comprise the polymer colorant or polymer composition herein. In embodiments, the article can be selected from the group consisting of toners, inks, toys, paints, fibers, machine parts, molded articles or products, extruded articles or products, and combinations thereof. The polymeric materials include at least one monomer possessing a natural color that provides pigmentation to the polymer produced therefrom. Thus, an article produced with the bio-based polymeric material of the present disclosure may not require the presence of a colorant. For example, in embodiments, the bio-based polymeric material of the present disclosure may possess a natural color, so that a toner produced with the polymeric material may not require a non-bio-based pigment. The resulting polymer is colored since the coloring agent or pigment is part of the polymer structure, and can be applied as a composition for toners, inks, plastics (including but not limited to molded or extruded products such as toys, machine parts, household materials such as, but not limited to, utensils, bowls, cups, stools, brush handles, bins, buckets, kitchenware, clothing hangers, ice cube trays), paints, fibers, molded products, extruded products, formed products by any suitable or desired formation process that is suitable for the polymer colorant herein, combinations thereof, and the like.

Toner.

In embodiments, a toner is provided comprising a polymer comprising polyester monomer units; and at least one alizarin unit which is incorporated into the polymer and which provides color to the polymer; and optionally, one or more ingredients selected from the group consisting of crystalline polyester resins, amorphous polyester resins, colorants, waxes, coagulants, and mixtures and combinations thereof.

In embodiments, the toner comprises a polymer comprising bio-based polyester, bio-renewable alizarin, or both bio-based polyester and bio-renewable alizarin.

The polymer herein can be present in the toner in any suitable or desired amount, in embodiments, in an amount of from about 60 to about 100 weight percent of the toner, from about 70 to about 95 weight percent, or from about 80 to about 90 weight percent of the toner.

In a specific embodiment, the toner herein comprises a polymer including alizarin and 1-decyl-12-methyl dodecanedioate of the formula

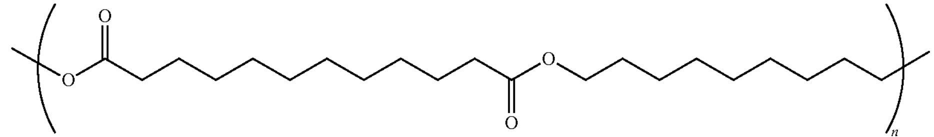

wherein n is an integer from 1 to 1,000.

In embodiments, the toner herein comprises a polymer including alizarin units selected from the group consisting of 1,3-dihydroxyanthraquinone, 1,4-dihydroxyanthraquinone, 1,5-dihydroxyanthraquinone, 1,6-dihydroxyanthraquinone, 1,7-dihydroxyanthraquinone, 1,8-dihydroxyanthraquinone, 2,3-dihydroxyanthraquinon, 2,6-dihydroxyanthraquinone, 2,7-dihydroxyanthraquinone, and mixtures and combinations thereof.

In embodiments, the toner color is tuned by selecting a mole percent of alizarin based on the total mole percent of components comprising the toner.

In addition to the polymer comprising polymer monomer units and alizarin monomer units, the polymer colorant, polymer composition, article therefrom, or toner described above, may further comprise one or more additional resin materials, as known in the art, to provide desired results. The one or more additional resin materials can be, for example, amorphous, semi-crystalline or crystalline, and can be derived either from petroleum sources or can be bio-based from renewable sources. The additional resin materials can be an acrylate-based resin, a styrene-based resin, a polyester resin or the like. Numerous suitable such resins are known.

Examples of semi-crystalline resins which may be utilized include polyesters, polyamides, polyimides, polyisobutyrate and polyolefins, such as, polyethylene, polybutylene, ethylene-propylene copolymers, ethylene-vinyl acetate copolymers, polypropylene, combinations thereof, and the like. Suitable polyhydroxyalkanoate semi-crystalline resins include polyhydroxybutyrate (PHB), polyhydroxyvalerate (PHV) and copolyesters containing randomly arranged units of 3-hydroxybutyrate (HB) and/or 3-hydroxyvalerate (HV), such as, poly-beta-hydroxybutyrate-co-beta-hydroxyvalerate, and combinations thereof. Other suitable polyhydroxyalkanoate resins are described, for example, in U.S. Pat. No. 5,004,664, the disclosure of which is hereby incorporated by reference in entirety. Commercially available polyhydroxyalkanoates resins which may be utilized include BIOPOL™ (commercially available from Imperial Chemical Industries, Ltd (ICI), England), or those sold under the name MIREL™ in solid or emulsion form (commercially available from Metabolix).

The ratio of the parts by weight of the polymer colorant or polyester composition to the one or more additional resins, such as, a crystalline resin can be any suitable or desired ratio, in embodiments, from about 100:0 to about 50:50, from about 99:1, from about 95:5 to about 70:30, to about 80:20, based on 100 parts by weight of total polymer colorant or polyester composition and additional resin or resins.

Additional Colorant.

The polymer colorant, polymer composition, article, or toner herein can optionally contain one or more colorants in addition to the polymer colorant described herein. Inclusion of an additional colorant can be used to further tune the inherently colored polymer colorant, polymer composition, article or toner.

The additional colorant can include any suitable or desired colorant including carbon black, such as, REGAL 330® and Nipex 35; magnetites, such as, Mobay magnetites, MO8029™ and MO8060™; Columbian magnetites, MAPICO® BLACK; surface-treated magnetites; Pfizer magnetites, CB4799™, CB5300™, CB5600™ and MCX6369™; Bayer magnetites, BAYFERROX 8600™ and 8610™; Northern Pigments magnetites, NP604™ and NP608™; Magnox magnetites, TMB-100™ or TMB-104™; and the like.

Colored pigments, such as, cyan, magenta, yellow, red, orange, green, brown, blue or mixtures thereof may also be used. The additional pigment or pigments may be used as water-based pigment dispersions.

Examples of pigments include SUNSPERSE® 6000, FLEXIVERSE® and AQUATONE®, water-based pigment dispersions from SUN Chemicals; HELIOGEN BLUE L6900™, D6840™, D7080™, D7020™, PYLAM OIL BLUE™, PYLAM OIL YELLOW™ and PIGMENT BLUE I™ available from Paul Uhlich & Company, Inc.; PIGMENT VIOLET I™, PIGMENT RED 48™, LEMON CHROME YELLOW DCC 1026™, TOLUIDINE RED™ and BON RED C™ available from Dominion Color Corporation, Ltd., Toronto, Ontario; NOVAPERM YELLOW FGL™ and HOSTAPERM PINK E™ from Hoechst; CINQUASIA MAGENTA™ available from E.I. DuPont de Nemours & Co., and the like.

Examples of magenta pigments include 2,9-dimethyl-substituted quinacridone, an anthraquinone dye identified in the Color Index as CI 60710, CI Dispersed Red 15, a diazo dye identified in the Color Index as CI 26050, CI Solvent Red 19 and the like.

Illustrative examples of cyan pigments include copper tetra (octadecylsulfonamido) phthalocyanine, a copper phthalocyanine pigment listed in the Color Index as CI 74160, CI Pigment Blue, Pigment Blue 15:3, Pigment Blue 15:4, an Anthrazine Blue identified in the Color Index as CI 69810, Special Blue X-2137 and the like.

Illustrative examples of yellow pigments are diarylide yellow 3,3-dichlorobenzidene acetoacetanilide, a monoazo pigment identified in the Color Index as CI 12700, CI Solvent Yellow 16, a nitrophenyl amine sulfonamide identified in the Color Index as Foron Yellow SE/GLN, CI Disperse Yellow 3,2,5-dimethoxy-4-sulfonanilide phenylazo-4'-chloro-2,5-dimethoxy acetoacetanilide and Permanent Yellow FGL.

Other known colorants may be used, such as, Levanyl Black A-SF (Miles, Bayer) and Sunsperse® Carbon Black LHD 9303 (Sun Chemicals), and colored dyes, such as, Neopen Blue (BASF), Sudan Blue OS (BASF), PV Fast Blue B2G 01 (American Hoechst), Sunsperse® Blue BHD 6000 (Sun Chemicals), Irgalite® Blue BCA (CibaGeigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm® Yellow FG 1 (Hoechst), Permanent Yellow YE 0305 (Paul Uhlich), Lumogen Yellow D0790 (BASF), Sunsperse® Yellow YHD 6001 (Sun Chemicals), Suco-Gelb L1250 (BASF), SUCD-Yellow D1355 (BASF), Hostaperm® Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), combinations of the foregoing and the like. Other pigments that may be used, and which are commercially available include various pigments in the color classes, Pigment Yellow 74, Pigment Yellow 14, Pigment Yellow 83, Pigment Orange 34, Pigment Red 238, Pigment Red 122, Pigment Red 48:1, Pigment Red 269, Pigment Red 53:1, Pigment Red 57:1, Pigment Red 83:1, Pigment Violet 23, Pigment Green 7 and so on, and combinations thereof.

Surfactants.

Toner compositions may be in dispersions including surfactants. Emulsion aggregation methods where the polymer as described herein and other components of the toner are in combination may employ one or more surfactants to form an emulsion.

One, two or more surfactants may be used. The surfactants may be selected from ionic surfactants and nonionic surfactants, or combinations thereof. Anionic surfactants and cationic surfactants are encompassed by the term, "ionic surfactants."

The surfactant or the total amount of surfactants may be used in any suitable or desired amount, such as an amount of from about 0.01% to about 5% by weight of the toner-forming composition, from about 0.75% to about 4% by weight of the toner-forming composition, from about 1% to about 3% by weight of the toner-forming composition.

Examples of nonionic surfactants include, for example, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether and dialkylphenoxy poly(ethyleneoxy) ethanol, for example, available from Rhone-Poulenc as IGEPAL CA210™, IGEPAL CA520™, IGEPAL CA720™, IGEPAL CO890™, IGEPAL CO-720™, IGEPAL CO290™, IGEPAL CA210™, ANTAROX 890™ and ANTAROX 897™. Other examples of suitable nonionic surfactants include a block copolymer of polyethylene oxide and polypropylene oxide, including those commercially available as SYNPERONIC® PR/F, in embodiments, SYNPERONIC® PR/F 108; and a DOWFAX, available from The Dow Chemical Corp.

Anionic surfactants include sulfates and sulfonates, such as, sodium dodecylsulfate (SDS), sodium dodecylbenzene sulfonate, sodium dodecylnaphthalene sulfate and so on; dialkyl benzenealkyl sulfates; acids, such as, palmitic acid, and NEOGEN® or NEOGEN® SC obtained from Daiichi Kogyo Seiyaku, and so on, combinations thereof and the like. Other suitable anionic surfactants include, in embodiments, alkyldiphenyloxide disulfonates or TAYCA POWER® BN2060 from Tayca Corporation (Japan), which is a branched sodium dodecyl benzene sulfonate. Combinations of those surfactants and any of the foregoing nonionic surfactants may be used in embodiments.

Examples of cationic surfactants include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, trimethyl ammonium bromides, halide salts of quartemized polyoxyethylalkylamines, dodecylbenzyl triethyl ammonium chlorides, MIRAPOL® and ALKAQUAT® available from Alkaril Chemical Company, SANISOL® (benzalkonium chloride) available from Kao Chemicals and the like, and mixtures thereof, including, for example, a nonionic surfactant as known in the art or provided hereinabove.

Waxes.

The toners herein may optionally contain a wax, which may be either a single type of wax or a mixture of two or more different types of waxes (hereinafter identified as, "a wax"). A wax may be added to a toner formulation or to a developer formulation, for example, to improve particular toner properties, such as, toner particle shape, charging, fusing characteristics, gloss, stripping, offset properties and the like. Alternatively, a combination of waxes may be added to provide multiple properties to a toner or a developer composition. A wax may be included as, for example, a fuser roll release agent.

The wax may be combined with the polymer comprising polyester monomer units and alizarin units for forming toner particles. When included, the wax may be present in any suitable or desired amount, such as from about 1 weight percent to about 25 weight percent of the toner particles, or from about 5 weight percent to about 20 weight percent of the toner particles.

Waxes that may be selected include waxes having, for example, a weight average molecular weight of from about 500 to about 20,000, from about 1,000 to about 10,000. Waxes that may be used include, for example, polyolefins, such as, polyethylene, polypropylene and polybutene waxes, such as, those that are commercially available, for example, POLYWAX™ polyethylene waxes from Baker Petrolite, wax emulsions available from Michaelman, Inc. or Daniels Products Co., EPOLENE N15™ which is commercially available from Eastman Chemical Products, Inc., VISCOL 550-P™, a low weight average molecular weight polypropylene available from Sanyo Kasei K.K.; plant-based waxes, such as carnauba wax, rice wax, candelilla wax, sumac wax and jojoba oil; animal-based waxes, such as beeswax; mineral-based waxes and petroleum-based waxes, such as montan wax, ozokerite, ceresin wax, paraffin wax, microcrystalline wax and Fischer-Tropsch waxes; ester waxes obtained from higher fatty acids and higher alcohols, such as stearyl stearate and behenyl behenate; ester waxes obtained from higher fatty acids and monovalent or multivalent lower alcohols, such as butyl stearate, propyl oleate, glyceride monostearate, glyceride distearate and pentaerythritol tetrabehenate; ester waxes obtained from higher fatty acids and multivalent alcohol multimers, such as diethyleneglycol monostearate, dipropyleneglycol distearate, diglyceryl distearate and triglyceryl tetrastearate; sorbitan higher fatty acid ester waxes, such as sorbitan monostearate; cholesterol higher fatty acid ester waxes, such as, cholesteryl stearate and so on.

Examples of functionalized waxes that may be used include, for example, amines and amides, for example, AQUA SUPERSLIP 6550™ and SUPERSLIP 6530™ available from Micro Powder Inc.; fluorinated waxes, for example, POLYFLUO 190™, POLYFLUO 200™, POLYSILK 19™ and POLYSILK 14™ available from Micro Powder Inc.; mixed fluorinated amide waxes, for example, MICROSPERSION 19™ also available from Micro Powder Inc.; imides, esters, quaternary amines, carboxylic acids, acrylic polymer emulsions, for example, JONCRYL 74™, 89™, 130™, 537™ and 538™ available from SC Johnson Wax; and chlorinated polypropylenes and polyethylenes available from Allied Chemical, Petrolite Corp. and SC Johnson. Mixtures and combinations of the foregoing waxes also may be used in embodiments.

Aggregating Factor.

An aggregating factor may be used and may be an inorganic cationic coagulant, such as, polyaluminum chloride (PAC), polyaluminum sulfosilicate (PASS), aluminum sulfate, zinc sulfate, magnesium sulfate, chlorides of magnesium, calcium, zinc, beryllium, aluminum, sodium, other metal halides including monovalent and divalent halides.

The aggregating factor may be present in an emulsion in an amount of, for example, from about 0 to about 10 weight percent, from about 0.05 to about 5 weight percent based on the total solids in the toner.

The aggregating factor may also contain minor amounts of other components, for example, nitric acid.

In embodiments, a sequestering agent or chelating agent may be introduced after aggregation is complete to sequester or to extract a metal complexing ion, such as, aluminum, from the aggregation process. Thus, the sequestering, chelating or complexing agent used after aggregation is complete may comprise a complexing component, such as, ethylenediaminetetraacetic acid (EDTA), gluconal, hydroxyl-2,2'iminodisuccinic acid (HIDS), dicarboxylmethyl glutamic acid (GLDA), methyl glycidyl diacetic acid (MGDA), hydroxydiethyliminodiacetic acid (HIDA), sodium gluconate, potassium citrate, sodium citrate, nitrotriacetate salt, humic acid, fulvic acid; salts of EDTA, such as, alkali metal salts of EDTA, tartaric acid, gluconic acid, oxalic acid, polyacrylates, sugar acrylates, citric acid, polyasparic acid, diethylenetriamine pentaacetate, 3-hydroxy-4-pyridinone, dopamine, eucalyptus, iminodisuccinic acid, ethylenediaminedisuccinate, polysaccharide, sodium ethylenedinitrilotetraacetate, thiamine pyrophosphate, farnesyl pyrophosphate, 2-aminoethylpyrophosphate, hydroxyl ethylidene-1,1-diphosphonic acid, aminotrimethylenephosphonic acid, diethylene triaminepentamethylene phosphonic acid, ethylenediamine tetramethylene phosphonic acid, and mixtures thereof.

Toner Particle Preparation.

The toner particles may be prepared by any method within the purview of one skilled in the art, for example, any of the emulsion/aggregation methods may be used with the alizarin polymer described herein. However, any suitable method of preparing toner particles may be used, including chemical processes, such as, suspension and encapsulation processes disclosed, for example, in U.S. Pat. Nos. 5,290,654 and 5,302,486, the disclosure of each of which hereby is incorporated by reference in entirety; by conventional granulation methods, such as, jet milling; pelletizing slabs of material; other mechanical processes; any process for producing nanoparticles or microparticles; and so on, if a polyester resin comprising a polyhedral oligomeric silsesquioxane of interest is used.

In embodiments relating to an emulsification/aggregation process, a resin (that is, the polyester-alizarin polymer described herein) may be dissolved in a solvent, and may be mixed into an emulsion medium, for example water, such as, deionized water, optionally containing a stabilizer, and optionally a surfactant. Examples of suitable stabilizers include water-soluble alkali metal hydroxides, such as, sodium hydroxide, potassium hydroxide, lithium hydroxide, beryllium hydroxide, magnesium hydroxide, calcium hydroxide or barium hydroxide. When a stabilizer is used, the stabilizer may be present in amounts of from about 0.1% to about 5%, from about 0.5% to about 3% by weight of the resin. The stabilizer may be added to the mixture at ambient temperature, or may be heated to the mixture temperature prior to addition.

Optionally, a surfactant may be added to the aqueous emulsion medium, for example, to afford additional stabilization to the resin or to enhance emulsification of the resin. Suitable surfactants include anionic, cationic and nonionic surfactants as taught herein.

In embodiments relating to an exemplified emulsion aggregation process, following emulsification, toner compositions may be prepared by aggregating a mixture of a resin, an optional colorant, an optional wax and any other desired reactants in an emulsion, optionally, with surfactants as described above, and then optionally coalescing the aggregated mixture. A mixture may be prepared by adding an optional wax, an optional colorant or other materials, which may also be optionally in a dispersion, including a surfactant, to the emulsion comprising a resin-forming material, which may be a mixture of two or more emulsions containing the requisite reagents. The pH of the resulting mixture may be adjusted with an acid, such as, for example, acetic acid, nitric acid or the like. In embodiments, the pH of the mixture may be adjusted to from about 2 to about 4.5.

Additionally, in embodiments, the mixture may be homogenized. If the mixture is homogenized, mixing may be at from about 600 to about 4,000 rpm. Homogenization may be by any suitable means, including, for example, an IKA ULTRA TURRAX T50 probe homogenizer.

Aggregation.

Following preparation of the above mixture, often, it is desirable to form larger particles or aggregates, often sized in micrometers, of the smaller particles from the initial polymerization reaction, often sized in nanometers. An aggregating factor may be added to the mixture. Suitable aggregating factors include, for example, aqueous solutions of a divalent cation, a multivalent cation or a compound comprising same, as well as compounds comprising a metal ion.

The aggregating factor, as provided above, may be, for example, a polyaluminum halide, such as, polyaluminum chloride (PAC) or the corresponding bromide, fluoride or iodide; a polyaluminum silicate, such as, polyaluminum sulfosilicate (PASS); or a water soluble metal salt, including, aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate or combinations thereof.

In embodiments, the aggregating factor may be added to the mixture at a temperature that is below the $T_g$ of the resin or of a polymer.

The aggregating factor may be added to the mixture to form a toner in an amount of from about 0.1 part per hundred (pph) to about 1 pph, from about 0.25 pph to about 0.75 pph of the reaction mixture.

The aggregating factor may be metered into the mixture over time. For example, the factor may be added incrementally to the mixture over a period of from about 5 to about 240 minutes, from about 30 to about 200 minutes.

Addition of the aggregating factor also may be done while the mixture is maintained under stirred conditions, from about 50 rpm to about 1,000 rpm, from about 100 rpm to about 500 rpm; and at a temperature that is below the $T_g$ of the resin or polymer, from about 30° C. to about 90° C., from about 35° C. to about 70° C. The growth and shaping of the particles following addition of the aggregation factor may be accomplished under any suitable condition(s).

The particles may be permitted to aggregate until a predetermined desired particle size is obtained. Particle size may be monitored during the growth process, for example, with a COULTER COUNTER, for average particle size. The aggregation thus may proceed by maintaining the mixture, for example, at elevated temperature, or slowly raising the temperature, for example, from about 40° C. to about 100° C., and holding the mixture at that temperature for from about 0.5 hours to about 6 hours, from about hour 1 to about 5 hours, while maintaining stirring, to provide the desired aggregated particles. Once the predetermined desired particle size is attained, the growth process is halted.

Characteristics of the toner particles may be determined by any suitable technique and apparatus. Volume average particle diameter and geometric standard deviation may be measured using an instrument, such as, a Beckman Coulter MULTISIZER 3, operated in accordance with the instructions of the manufacturer.

In embodiments, the aggregate particles may be of a size of less than about 6 μm, from about 2 to about 5 μm, from about 2.5 μm to about 4.5 μm.

Coalescence.

Following aggregation to a desired particle size and application of any optional shell, the particles may be coalesced to a desired final shape, such as, a circular shape, for example, to correct for irregularities in shape and size, coalescence being achieved by, for example, heating the mixture to a temperature from about 45° C. to about 100° C., from about 55° C. to about 99° C., which may be at or above the $T_g$ of the resins used to form the toner particles, and/or reducing the stirring, for example, from about 1000 rpm to about 100 rpm, from about 800 rpm to about 200 rpm. Coalescence may be conducted over a period from about 0.01 to about 9 hours, from about 0.1 to about 4 hours, see, for example, U.S. Pat. No. 7,736,831.

After aggregation and/or coalescence, the mixture may be cooled to room temperature, such as, from about 20° C. to about 25° C. The cooling may be rapid or slow, as desired. After cooling, the toner particles optionally may be washed with water and then dried.

Optionally, a coalescing agent may be used. Examples of suitable coalescence agents include, but are not limited to, benzoic acid alkyl esters, ester alcohols, glycol/ether-type solvents, long chain aliphatic alcohols, aromatic alcohols, mixtures thereof and the like.

The coalescence agent (or coalescing agent or coalescence aid agent) evaporates, that is, generally above the $T_g$ of the resin or a polymer. The final toner particles are thus, free of, or essentially or substantially free of any remaining coalescence agent. To the extent that any remaining coalescence agent may be present in a final toner particle, the amount of remaining coalescence agent is such that presence thereof does not impact any properties or the performance of the toner or developer.

The coalescence agent may be added prior to the coalescence or fusing step in any desired or suitable amount. For example, the coalescence agent may be added in an amount of from about 0.01 to about 10% by weight, based on the solids content in the reaction medium, from about 0.05, from about 0.1% to about 0.5, to about 3.0% by weight, based on the solids content in the reaction medium. Of course, amounts outside those ranges may be used, as desired.

In embodiments, the coalescence agent may be added at any time between aggregation and coalescence, although in some embodiments it may be desirable to add the coalescence agent after aggregation is, "frozen," or completed, for example, by adjustment of pH, for example, by addition, for example, of base.

Shell.

An optional shell may be applied to the formed toner particles, aggregates or coalesced particles. Any polymer, including those described above as suitable for the core, such as the polyester-alizarin polymer, may be used for the shell. The shell polymer may be applied to the particles or aggregates by any method within the purview of those skilled in the art.

In embodiments, an amorphous polyester resin may be used to form a shell over the particles or aggregates to form toner particles or aggregates having a core-shell configuration. In embodiments, a low molecular weight amorphous polyester resin may be used to form a shell over the particles or aggregates.

Formation of the shell over the aggregated particles may occur while heating to a temperature from about 30° C. to about 80° C., from about 35° C. to about 70° C. Formation of the shell may take place for a period of time from about 5 minutes to about 10 hours, from about 10 minutes to about 5 hours.

The shell may be present in an amount from about 1% by weight to about 80% by weight of the toner components, from about 10% by weight to about 40% by weight of the toner components, from about 20% by weight to about 35% by weight of the toner components.

Optional Additives.

The toner may include known charge additives in amounts of from about 0.1 to about 10 weight %, from about 0.5 to about 7 weight % of the toner. Examples include alkyl pyridinium halides, bisulfates, the charge control additives of U.S. Pat. Nos. 3,944,493; 4,007,293; 4,079,014; 4,394,430; and 4,560,635, the disclosure of each of which hereby is incorporated by reference in entirety.

Charge enhancing molecules may be used to impart either a positive or a negative charge on a toner particle. Examples include quaternary ammonium compounds, see, for example, U.S. Pat. No. 4,298,672, organic sulfate and sulfonate compounds, see for example, U.S. Pat. No. 4,338,390, cetyl pyridinium tetrafluoroborates, distearyl dimethyl ammonium methyl sulfate, aluminum salts and so on.

Such enhancing molecules may be present in an amount of from about 0.1 to about 10%, from about 1 to about 3% by weight.

Surface Modifications.

Surface additives may be added to the toner of the present disclosure, for example, after washing or drying. Examples of surface additives include, for example, one or more of a metal salt, a metal salt of a fatty acid, a colloidal silica, a metal oxide, such as, $TiO_2$ (for example, for improved RH stability, tribo control and improved development and transfer stability), an aluminum oxide, a cerium oxide, a strontium titanate, $SiO_2$, mixtures thereof and the like. Examples of such additives include those disclosed in U.S. Pat. Nos. 3,590,000; 3,720,617; 3,655,374; and 3,983,045, the disclosure of each of which hereby is incorporated by reference in entirety.

Surface additives may be used in an amount of from about 0.1 to about 10 weight percent or from about 0.5 to about 7 weight percent of the toner.

Other surface additives include lubricants, such as, a metal salt of a fatty acid (e.g., zinc or calcium stearate) or long chain alcohols, such as, UNILIN 700 available from Baker Petrolite and AEROSIL R972® available from Degussa. The coated silicas of U.S. Pat. Nos. 6,190,815 and 6,004,714, the disclosure of each of which hereby is incorporated by reference in entirety, also may be present. The additive may be present in an amount of from about 0.05 to about 5%, from about 0.1 to about 2% of the toner, which additives may be added during the aggregation or blended into the formed toner product.

Silica, for example, may enhance toner flow, tribo control, admix control, improved development and transfer stability and higher toner blocking temperature. Zinc, calcium or magnesium stearate also may provide developer conductivity, tribo enhancement, higher toner charge and charge stability. The external surface additives may be used with or without a coating or shell. Some additives are illustrated in U.S. Pat. Nos. 3,590,000, 3,800,588 and 6,214,507, the disclosure of each of which is incorporated herein by reference.

The gloss of a toner may be influenced by the amount of retained metal ion, such as, $Al^{3+}$, in a particle. The amount of retained metal ion may be adjusted further by the addition of a chelator, such as, EDTA. In embodiments, the amount of retained metal ion in toner of the present disclosure may be from about 0.1 pph to about 1 pph, from about 0.25 pph to about 0.8 pph. The gloss level of a toner of the instant disclosure may have a gloss, as measured by Gardner gloss units (gu), from about 20 gu to about 100 gu, from about 50 gu to about 95 gu, from about 60 gu to about 90 gu.

Toner of the instant disclosure also may possess a parent toner charge per mass ratio (q/m) of from about −5 μC/g to about −90 μC/g, and a final toner charge after surface additive blending of from about −15 μC/g to about −80 μC/g.

The dry toner particles, exclusive of external surface additives, may have the following characteristics: (1) volume average diameter (also referred to as "volume average particle diameter") of from about 2.5 to about 20 μm, from about 2.75 to about 10 μm, from about 3 to about 7.5 μm; (2) number average geometric standard deviation (GSDn) and/or volume average geometric standard deviation (GSDv) of from about 1.18 to about 1.30, from about 1.21 to about 1.24; and (3) circularity of from about 0.9 to about 1.0 (measured with, for example, a Sysmex FPIA 2100 analyzer), from about 0.95 to about 0.985, from about 0.96 to about 0.98.

Developers.

The toner particles thus formed may be formulated into a developer composition. For example, the toner particles may be mixed with carrier particles to achieve a two component developer composition. The toner concentration in the developer may be from about 1% to about 25% by weight of the total weight of the developer, from about 2% to about 15% by weight of the total weight of the developer, with the remainder of the developer composition being the carrier. However, different toner and carrier percentages may be used to achieve a developer composition with desired characteristics.

Carriers.

Examples of carrier particles for mixing with the toner particles include those particles that are capable of triboelectrically obtaining a charge of polarity opposite to that of the toner particles. Illustrative examples of suitable carrier particles include granular zircon, granular silicon, glass, steel, nickel, ferrites, iron ferrites, silicon dioxide, one or more polymers and the like. Other carriers include those disclosed in U.S. Pat. Nos. 3,847,604; 4,937,166; and 4,935,326.

Suitable carriers may include a core, for example, of from about 25 to about 100 μm in size, from about 50 to about 75 μm in size.

In embodiments, the carrier particles may include a core with a coating thereover, which may be formed from a polymer or a mixture of polymers that are not in close proximity thereto in the triboelectric series, such as, those as taught herein or as known in the art. The coating may include fluoropolymers, such as polyvinylidene fluorides, terpolymers of styrene, methyl methacrylates, silanes, such as triethoxy silanes, tetrafluoroethylenes, other known coatings and the like. The coating may have a coating weight of, for example, from about 0.1 to about 5 percent by weight of the carrier or from about 0.5 to about 2 percent by weight of the carrier. A coating may comprise a carbon black, see, for example, in U.S. Pat. Nos. 5,236,629 and 5,330,874.

The carrier particles may be prepared by mixing the carrier core with polymer in an amount from about 0.05 to about 10% by weight, from about 0.01 to about 3% by weight, based on the weight of the coated carrier particle, until adherence thereof to the carrier core is obtained, for example, by mechanical impaction and/or electrostatic attraction.

Devices Comprising a Toner Particle.

Toners and developers may be combined with a number of devices ranging from enclosures or vessels, such as, a vial, a bottle, a flexible container, such as a bag or a package, and so on, to devices that serve more than a storage function.

The toner compositions and developers of interest may be incorporated into devices dedicated, for example, to delivering same for a purpose, such as, forming an image. Hence, particularized toner delivery devices are known, see, for example, U.S. Pat. No. 7,822,370, and may contain a toner preparation or developer of interest. Such devices include cartridges, tanks, reservoirs and the like, and may be replaceable, disposable or reusable. Such a device may comprise a storage portion; a dispensing or delivery portion; and so on; along with various ports or openings to enable toner or developer addition to and removal from the device; an optional portion for monitoring amount of toner or developer in the device; formed or shaped portions to enable siting and seating of the device in, for example, an imaging device; and so on.

A toner or developer of interest may be included in a device dedicated to delivery thereof, for example, for recharging or refilling toner or developer in an imaging device component, such as, a cartridge, in need of toner or developer, see, for example, U.S. Pat. No. 7,817,944, wherein the imaging device component may be replaceable or reusable.

Latex.

In embodiments, the polymer colorant herein can be used to form a polymer colorant latex. The polymer colorant latex can then be used for any suitable or desired application. The polymer latex can be incorporated into any suitable or desired product. A polymer colorant latex herein comprises an aqueous dispersion of polymer colorant, wherein the polymer colorant comprises polymer monomer units and at least one alizarin unit which is incorporated into the polymer and which provides color to the polymer colorant, and optionally one or more additional components selected from any suitable or desired component suitable for latex. The one or more additional components can be selected based on the product or application for which the polymer colorant latex is to be used.

The polymer latex comprising the present polymer colorant can further comprise any suitable or desired polymer material or latex additive. For example, additional monomers, polymers, and other materials described hereinabove for polymer colorant or toner preparation can be included in a polymer latex herein containing the present polymer colorant.

In embodiments, the polymer latex herein can further comprise an aqueous dispersion of polyester. Any suitable or desired polyester can be used for the ink compositions herein. In embodiments, the polyester can be a material described in U.S. Pat. No. 6,593,049 and U.S. Pat. No. 6,756,176, which are each hereby incorporated by reference herein in their entireties. Suitable resins can also include a mixture of an amorphous polyester resin and a crystalline polyester resin as described in U.S. Pat. No. 6,830,860, which is hereby incorporated by reference herein in its entirety.

In embodiments, the polymer latex herein comprises the present polymer colorant and an amorphous polyester, a crystalline polyester, or a mixture of amorphous polyester and crystalline polyester.

Imaging Devices.

The toners or developers may be used for electrostatographic or electrophotographic processes, including those disclosed in U.S. Pat. No. 4,295,990, the disclosure of which hereby is incorporated by reference in entirety. Any known type of image development system may be used in an image developing device, including, for example, magnetic brush development, jumping single component development, hybrid scavengeless development (HSD) and the like. Those and similar development systems are within the purview of those skilled in the art.

Color printers commonly use four housings carrying different colors to generate full color images based on black plus the standard printing colors, cyan, magenta and yellow. However, in embodiments, additional housings may be desirable, including image generating devices possessing five housings, six housings or more, thereby providing the ability to carry additional toner colors to print an extended range of colors (extended gamut).

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Example 1

Fabrication of bio-renewable polymeric colorant comprising 14 weight percent bio-based alizarin based on the weight of the overall polymer of which 71 percent by weight of the polymeric colorant is bio-based and the last 15 percent is petroleum based. A 250 milliliter (ml) round bottom flask was charged with 1,6-hexanediol (1,6-HD, 250 millimoles (mmol) obtained from Sigma-Aldrich®, 0.31 equivalents (eq.), 29.5 grams), alizarin (250 mmol, 0.074 eq., 14.30 grams) obtained from Sigma-Aldrich®, succinic acid (500 mmol, 0.621 eq., 59.0 grams) obtained from Sigma-Aldrich®, and butyl hydrogen stannate catalyst (Fascat® 4100, 5 mmol, 0.0062 eq., 1.124 g). The flask was fitted with an overhead stirrer, heating mantle, nitrogen line, condenser and Dean-Stark trap. The polymerization took place at 190 to 195° C. for 15 hours. Water formed during the condensation polymerization and was collected in the trap. The polymer was discharged from the flask once the acid value was below 1 mg KOH/g resin.

Example 2

Fabrication of bio-renewable polymeric colorant comprising 4 percent bio-based component (alizarin is the only bio-based component). That is, Example 2 comprises a 4 percent bio-based polymer colorant by weight wherein alizarin is the only bio-based component based on the overall polymer. A 250 ml round bottom flask was charged with 1,6-hexanediol (1,6-HD, 300 mmol, 0.40 eq., 35.5 grams), alizarin (22.5 mmol, 0.03 eq., 5.40 grams), dimethyl terephthalate (DMT, 450 mmol, 0.60 eq., 87.0 g) obtained from Sigma-Aldrich®, and butyl hydrogen stannate catalyst (Fascat® 4100, 5 mmol, 0.0067 eq., 1.124 grams). The flask was fitted with an overhead stirrer, heating mantle, nitrogen line, condenser and Dean-Stark trap. The polymerization took place at 190 to 195° C. for 15 hours. Water formed during the condensation polymerization and was collected in the trap. The polymer was discharged from the flask once the softening point (Ts) reached greater than 100° C. The Ts of the resin was determined by the Mettler FP 800 Thermosystem consisting of FP80 Central Processor and FP83 Dropping Cell. The temperature was programmed to increase at 1° C./minute until the target Ts was reached.

Example 3

Fabrication of bio-renewable polymeric colorant comprising 60 percent by weight bio-sourced 1,12-dodecanedioic acid and 20 percent by weight petroleum-based 1,12-dodecanedioic acid. 60 weight percent of the polymeric colorant of Example 3 is bio-based including both alizarin (7 weight percent) and the other bio-based materials that comprise the polymeric colorant. A 250 ml round bottom flask was charged with 1,3-propanediol (180 mmol, 0.30 eq., 13.70 grams) obtained from Sigma-Aldrich®, alizarin (30 mmol, 0.05 eq., 7.21 grams), dimethyl terephthalate (DMT, 210 mmol, 0.35 eq., 40.8 grams), 1,12-dodecanedioic acid (180 mmol, 0.30 eq., 41.50 grams) obtained from Sigma-Aldrich®, and butyl hydrogen stannate catalyst (Fascat® 4100, 5 mmol, 0.0083 eq., 1.124 grams). The flask was fitted with an overhead stirrer, heating mantle, nitrogen line, condenser and Dean-Stark trap. The polymerization took place at 195 to 205° C. for 20 hours. Water formed during the condensation polymerization and was collected in the trap. The polymer was discharged from the flask without any analysis since the material was very crumbly/chalky. Color analysis was carried out on this polymeric material.

Example 4

Fabrication of bio-renewable polymeric colorant comprising 4 percent by weight bio-based component (alizarin is the only bio-based component) based on the total weight of the polymeric colorant. A 250 ml round bottom flask was charged with 1,6-hexanediol (400 mmol, 0.95 eq., 47.3 grams), alizarin (21.05 mmol, 0.05 eq., 5.06 grams), isophthalic acid (421 mmol, 1.0 eq., 69.9 grams) obtained from Sigma-Aldrich®, and butyl hydrogen stannate catalyst (Fascat® 4100, 7.16 mmol, 0.017 eq., 1.495 grams). The flask was fitted with an overhead stirrer, heating mantle, nitrogen line, condenser and Dean-Stark trap. The polymerization took place at 200 to 210° C. for 24 hours. Water formed during the condensation polymerization and was collected in the trap. The polymer was discharged from the flask once the softening point (Ts) reached greater than 80° C. The Ts of the resin was determined by the Mettler FP 800 Thermosystem consisting of FP80 Central Processor and FP83 Dropping Cell. The temperature was programmed to increase at 1° C./minutes until the target Ts was reached.

Example 5

Fabrication of bio-renewable polymeric colorant comprising 3.5 weight percent bio-based alizarin. Example 5 comprises a 100 percent by weight bio-based polymer; that is, all monomers are bio-based with 3.5 percent by weight being alizarin. A 250 ml round bottom flask was charged with azelaic acid (69.8 mmol, 0.10 eq., 13.13 grams) obtained from Sigma-Aldrich®, alizarin (13.95 mmol, 0.02 eq., 3.35 grams), succinic acid (314 mmol, 0.45 eq., 37.1 grams), isosorbide (300 mmol, 0.43 eq., 43.8 grams) obtained from Sigma-Aldrich® and butyl hydrogen stannate catalyst (Fascat® 4100, 13.95 mmol, 0.01 eq., 1.457 grams). The flask was fitted with an overhead stirrer, heating mantle, nitrogen line, condenser and Dean-Stark trap. The polymerization took place over a range of temperatures starting at 200° C. (17 hours) to 240° C. (8 hours). Water formed during the condensation polymerization and was collected in the trap. The polymer was discharged from the flask once the softening point (Ts) reached greater than 95° C. The Ts of the resin was determined by the Mettler FP 800 Thermosystem consisting of FP80 Central Processor and FP83 Dropping Cell. The temperature was programmed to increase at 1° C./minutes until the target Ts was reached.

Comparative Example 6

A comparative example was prepared as in Example 1 but with succinic acid (0.415 eq.), isosorbide (0.488 eq.), and azelaic acid (0.098 eq.). Comparative Example 6 is 100 percent bio-based, but does not exhibit the same color enhancement properties as the alizarin-based bio-based polymer of Example 5.

Comparative Example 7

A high molecular weight amorphous polymer comprising both propoxylated and ethoxylated bisphenol A polyester obtained from Kao Corporation, Japan). The polymer of Example 7 does not contain colorant.

Comparative Example 8

A low molecular weight amorphous polymer comprising propoxylated bisphenol A polyester obtained from Kao Corporation, Japan). The polymer of Example 8 does not contain colorant.

Analytical Characterization.

Table 1 shows analytical data for the alizarin-based polymers of Examples 1 through 5 and the comparative polymers of Examples 6 through 8.

TABLE 1

| Example | Ts (° C.) | AV | Mw | Mn | PDI | $Tg_{(on)}$ (° C.) |
|---|---|---|---|---|---|---|
| 8 | 118 | 14.7 | 16,470 | 4,350 | 3.79 | 58.8 |
| 7 | 129 | 12.0 | 105,160 | 5,150 | 20.4 | 55.7 |
| 6 | 105.5 | 6.4 | 11,500 | 4,700 | 2.45 | 52.8 |

TABLE 1-continued

| Example | Ts (° C.) | AV | Mw | Mn | PDI | $Tg_{(on)}$ (° C.) |
|---|---|---|---|---|---|---|
| 1 | n/a | 0.80 | 911 | 433 | 2.10 | Tm = 48.4 |
| 2 | 106.9 | 18.3 | 1,539 | 702 | 2.19 | −20.2/ 60.3 |
| 3 | n/a | 9.75 | 1,008 | 462 | 2.18 | Tm = 24.0 |
| 4 | 84.0 | 43.3 | 10,088 | 3,126 | 3.23 | 8.2 |
| 5 | 97.5 | 61.6 | 14,979 | 4,606 | 3.25 | 34.8 |

Ts = softening temperature

AV = acid value in mg KOH/g (milligrams of potassium hydroxide that is required to neutralize the acidic constituents in 1 gram of sample)

Mw = molecular weight

Mn = molecular number

PDI = polydispersity index, measured by Gel Permeation Chromatography (GPC)

$Tg_{(on)}$ = onset glass transition temperature

Tm = melting point temperature

Example 9

The five alizarin-based polymers of Examples 1 through 5 were applied as films onto a Xerox® Digital Color Elite paper substrate. For this purpose the polymeric colorants of Examples 1 through 5 were made molten by heating and then coated by using a 3 inch square blade with a gap of 10 mils. The samples were immediately removed from the hot surface and allowed to cool to room temperature. The physical attributes of the synthesized polymers of Examples 1 through 5 were mahogany brown to black-brown in color and ductility ranged from soft/malleable to hard/brittle; both physical traits were dependent on the polyester formulation and the types of monomers used.

Example 10

Color Characterization.

Measurement of color can, for example, be characterized by CIE (Commission International de l'Eclairage) specifications, commonly referred to as CIELAB, where L*, a* and b* are the modified opponent color coordinates, which form a 3 dimensional space, with L* characterizing the lightness of a color, a* approximately characterizing the redness, and b* approximately characterizing the yellowness of a color. Color measurements for the polymer colorants of Examples 1 through 5 were performed with a GretagMacbeth Spectrolino Colorimeter operating at a 2 degree of visual field with a light source D50. FIG. 1 shows the a* and b* of the CIE L*a*b* (CIELAB) color space. Pantone® primary colors are positioned between red/magenta (+ve values) and green (−ve values), a* and yellow (+ve values) and blue (−ve values), b*. The a*b* values of the polymers of Examples 1 through 5 all fall within the black region (middle of quadrant) and are in line with Pantone® black. The vertical dashed line in FIG. 1 highlights that the values of the examples are very close to 0,0 on both axes.

Example 11

Gloss Characterization.

Gloss measurements of the alizarin-based polymer colorants of Examples 1 through 5 were measured using the BYK Gardner Micro-Gloss 60° Gloss Meter. In embodiments, the present bio-renewable polymeric colorants enable the ability to tune the gloss of the resin as a function of the bio-renewable monomer used, the amount of crosslinking and in some cases by the degree of crystallinity of the polymer: crystalline, semi-crystalline or amorphous. Table 2 shows the gloss measurements of the alizarin-based polymers.

TABLE 2

| Example | Measurement 1 | Measurement 2 | Measurement 3 | Average | Finish |
|---|---|---|---|---|---|
| 1 | 1.1 | 1.4 | 1.1 | 1.2 | Very matte |
| 2 | 19.2 | 19.5 | 21.3 | 20.0 | Matte |
| 3 | 5.8 | 5.3 | 5.1 | 5.4 | Very matte |
| 4 | 98 | 99.8 | 100 | 99.3 | Very glossy |
| 5 | 86.7 | 91.7 | 92 | 90.1 | Very glossy |

Example 12

A 1 liter stainless steel reactor was charged with succinic acid (0.48 eq.) and alizarin (0.02 eq.), both from Sigma-Aldrich®, and the temperature was raised to 190° C. with stirring under a small amount of nitrogen flow. Then, 1,3-bis (aminomethyl)cyclohexane (0.50 eq.), from TCI Chemicals was continuously added dropwise to the molten succinic acid/alizarin from the dropping line under atmospheric pressure over two hours while stirring the molten succinic acid/alizarin at 40 rpm. During the dropwise addition, the inner temperature was continuously raised to 250° C. Water being distilled with the dropwise addition of 1,3-bis(aminomethyl)cyclohexane was removed from the reaction system through the partial condenser and the total condenser each being kept at 100° C. This batch polymerization vessel was required to have a partial condenser so that water vapor and the diamine were separated in the partial condenser and the diamine was returned to the polymerization vessel, thereby effectively preventing the escape of diamine component. After completing the dropwise addition of hexane-1,6-diamine, the pressure was held at atmospheric pressure for 20 minutes with continuous stirring while raising the temperature at a rate of 0.2° C./minute. Then, the pressure was decreased to 80 kPa over 5 minutes and held there for 15 minutes. Thereafter, the stirring torque at the set point was measured Immediately after the measurement of the stirring torque, the colored polyamide was discharged and solidified by water cooling.

Example 13

Step 1. 200.88 grams (2.64 mol) of 1,3-propanediol and 121.35 grams (0.6 mol) of pre-melted sebacic acid, both from Sigma-Aldrich®, were introduced into a 500 milliliter reactor, and the mixture was heated to approximately 100° C. with stirring until a clear material was obtained. 116.4 grams (0.6 mol) of dimethyl terephthalate and 4.8 grams (0.02 mol) alizarin, both from Sigma-Aldrich®, were then added, the mixture was then heated to 150° C. and 1.3 grams (0.3% by weight relative to the total weight of the reactants) of zinc acetate dihydrate (Sigma-Aldrich®) was then added. The temperature of the reaction mixture was maintained at 150° C. for 3 hours in order to remove the methanol/water formed by transesterification, then raised to 200° C. over 45 minutes and maintained for 3 hours. The mixture was then allowed to return to room temperature while stirring was decreased. Once the temperature reached 50° C., 300 milliliters of 1,2-dichloroethane were added. The solution was then diluted in 1.7 liters of 1,2-dichloroethane and further purified by washing with water. The organic phase was then dried over anhydrous sodium sulphate and following filtration, the extraction solvent was removed by evaporation under vacuum. Approximately 300 grams of expected polyester macrodiol was obtained.

Step 2. 78.6 grams (0.3 mol) of dicyclohexylmethane diisocyanate and 150 grams of 1,2-dichloroethane were introduced under nitrogen into a 1 liter reactor. The mixture was brought to reflux over 30 minutes under a stream of nitrogen, and then left stirring for 30 minutes at 80° C. 80.0 grams (0.15 mol) of the colored polyester macrodiol of Step 1 previously dissolved in 200 grams of 1,2-dichloroethane was then added dropwise over 15 minutes and at 80° C. After 3 hours, 4.8 grams (0.075 mol) of ethanolamine dissolved in 50 grams of 1,2-dichloroethane was added, and reaction was allowed to proceed for 1 hour. 10.05 grams (0.075 mol) of dimethylolpropionic acid previously dissolved in 30 grams of dimethylformamide was then introduced, followed by 0.45 grams of tin 2-ethylhexanoate. After 12 hours at 80° C., the absence of residual isocyanate groups was checked by infrared. (When the consumption of dicyclohexylmethane diisocyanate is not complete, 100 grams of ethanol is added to the mixture and reaction is allowed to proceed for a few more hours under reflux.) After cooling, the solution of colored polyester/polyurethane was purified by precipitation in cyclohexane, and the precipitate was dried under vacuum in an oven at 50° C.

In embodiments, the polymer colorants herein provide the benefits of both small molecule dyes and pigments. Advantages achieved by the present polymer colorants include enhanced chemical and thermal stability when compared with small molecule dyes because of incorporation of the colorant into polymeric structure; reduced colorant migration, improved compatibility with marking material base components due to similar chemical structures, when compared with pigments, color tuning by changing the bio-renewable co-monomer.

In further embodiments, the polymeric colorant herein comprising alizarin may provide a good replacement for carbon black in many plastic materials. The addition of pigment such as carbon black as a colorant requires good dispersion quality to ensure a proper level of blackness (light absorption—jetness) and undertone (scattering). When incorporated into a compound, the particle size of the carbon black becomes the primary influence on moisture pickup which may change the properties of the plastic, such as Tg due to plasticization and water barrier capability (e.g. packaging). Additional carbon black properties that may affect the performance of plastic compounds include other constituents of the carbon black such as sulfur, ash, residue, etc., and its physical form, i.e., powder or beads. The present inherently colored polymeric colorants can be used as part of the polymer (plastic) to resolve many of the problems that carbon black-based plastics may possess.

Advantages provided by the present colored polymer material incorporating alizarin colorant units within the polymeric chain include, but are not limited to, in a particular embodiment, providing a polymeric colorant comprising polyester, which embodiment is particularly suitable for fabrication of emulsion aggregation toner; providing a colored polymer that is bio-renewable and includes bio-renewable alizarin, and various level of bio-renewable copolymer component, as a bio-based alternative for partial or full pigmentation/color; providing enhanced color stability by reduced dye migration when compared with small molecule dyes since the alizarin unit is incorporated into a macromolecular structure, providing enhanced compatibility with most organic polymers, which is beneficial when compared with pigment based compositions when fabricating compositions of matter incorporating a colorant, by avoiding the necessity of pigment dispersing, which can be a tedious and resource consuming process; providing a color tuning feature wherein the present polymeric colorant be tuned from brownish red to black with the color controlled by the mole percentage of alizarin added to the formulation as well as the types of monomers used in combination with alizarin thus enabling the design of spot colors by using one material instead of synthesizing individual materials for individual desired colors. In embodiments, alizarin-based polymers having different color-tints are obtainable with the alizarin pigment and a specific monomer combination/equivalence loading. Further, by adding minimal amounts of carbon black, magenta, cyan, etc. the polymeric colorant can be used to simulate cool, rich black, brownish black, ruby black, warm black etc., but as a single spot-color instead of a CMKY black.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A polymer colorant comprising:

polymer monomer units; and at least one alizarin unit which is incorporated into the polymer and which provides color to the polymer colorant;

wherein the polymer is a bio-based, branched polyester resin comprising (i) the condensation product of (a) a hydroxyl donor; (b) a cyclic polyhydroxyl acceptor; and (c) an optional catalyst, and (ii) a polyacid, wherein said bio-based, branched polyester resin is greater than about 90% bio-based.

2. The polymer colorant of claim 1, wherein the polymer monomer units are selected from the group consisting of polyester monomer units, polyamide monomer units, polyurethane monomer units, and combinations thereof.

3. The polymer colorant of claim 1, wherein the polymer monomer units are bio-based, wherein the alizarin is bio-renewable, or wherein both the polymer monomer units are bio-based and the alizarin is bio-renewable.

4. The polymer colorant of claim 1, wherein the polymer monomer units provide an amorphous polyester, a crystalline polyester, or a combination thereof.

5. The polymer colorant of claim 1, wherein the polymer is a bio-based, branched polyester resin comprising (i) the polycondensation product of (a) glycerine carbonate and/or glycerol; and (b) a rosin acid selected from the group consisting of abietic acid, neoabietic acid, palustric acid, levopimaric acid, dihydroabietic acid, pimaric acid, isopimaric acid and combinations thereof; and (ii) a polyacid selected from the group consisting of succinic acid, fumaric acid, maleic acid, itaconic acid, dodecylsuccinic acid, glutaric acid, adipic acid, pimelic acid, suberic acid and azelaic acid.

6. The polymer colorant of claim 1, wherein the polymer is 1-decyl-12-methyl dodecanedioate of the formula

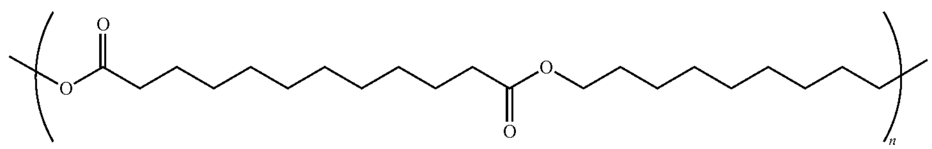

wherein n is an integer from 1 to 1,000.

7. A polymer colorant comprising polymer monomer units, wherein the polymer is a branched polyester comprising a compound of the formula:

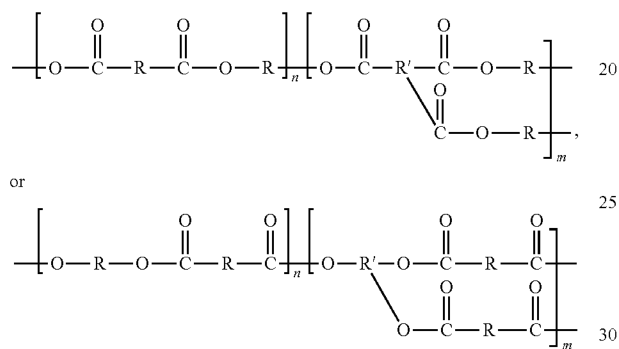

wherein R is an alkylene group, and wherein the alkylene group can be selected from linear and branched, saturated and unsaturated, cyclic and acyclic, and substituted and unsubstituted alkylene groups, and wherein heteroatoms either may or may not be present in the alkylene group;

wherein R' is an alkylene group, and wherein the alkylene group can be selected from linear and branched, saturated and unsaturated, cyclic and acyclic, and substituted and unsubstituted alkylene groups, and wherein heteroatoms either may or may not be present in the alkylene group;

wherein all carbonyl carbons adjacent to R' are separated by at least two atoms if the two atoms are separated by a single bond; or wherein all carbonyl carbons adjacent to R' are separated by at least 3 atoms covalently linked in series;

wherein m is an integer from about 1 to about 1,000; and wherein n is an integer from about 1 to about 1,000; and at least one alizarin unit which is incorporated into the polymer and which provides color to the polymer colorant.

8. The polymer colorant of claim 1, wherein the alizarin is a compound of the formula

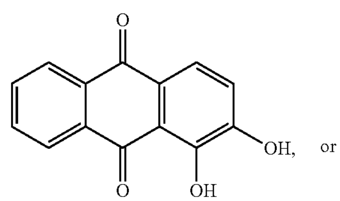

-continued

9. The polymer colorant of claim 1, wherein the alizarin is selected from the group consisting of 1,3-dihydroxyanthraquinone, 1,4-dihydroxyanthraquinone, 1,5-dihydroxyanthraquinone, 1,6-dihydroxyanthraquinone, 1,7-dihydroxyanthraquinone, 1,8-dihydroxyanthraquinone, 2,3-dihydroxyanthraquinon, 2,6-dihydroxyanthraquinone, 2,7-dihydroxyanthraquinone, and mixtures and combinations thereof.

10. The polymer colorant of claim 1, wherein the color of the polymer colorant is tuned by selecting a mole percent of alizarin based on the total mole percent of polymer units including polymer monomer units and alizarin units.

11. A polymer colorant of comprising polymer monomer units, wherein the polymer monomer units are selected from the group consisting of 1,6-heaxnediol, succinic acid, dimethyl terephthalate, 1,12-dodecanedioic acid, propanediol, isophthalic acid, azelaic acid, isosorbide, and combinations thereof; and at least one alizarin unit which is incorporated into the polymer and which provides color to the polymer colorant.

12. The polymer colorant of claim 1, wherein the color of the polymer colorant is pink, brown, grey, or black.

13. The polymer colorant of claim 1, wherein the polymer colorant has a final color that is determined by one or more of the following:

amount of alizarin units, type of monomer units, amount of monomer units; treatment of alizarin with a mordant, interaction of the alizarin monomeric unit with the other monomers comprising the polymer colorant.

14. The polymer colorant of claim 1, provided in an article selected from the group consisting of toners, inks, toys, paints, fibers, machine parts, molded products, extruded products, and combinations thereof.

15. The polymer colorant of claim 1, provided in a composition comprising the polymer colorant and optionally, a mordant.

16. A polymer latex comprising:

an aqueous dispersion of polymer colorant, wherein the polymer colorant comprises polymer monomer units and at least one alizarin unit which is incorporated into the polymer and which provides color to the polymer colorant;

wherein the polymer is a bio-based, branched polyester resin comprising (i) the condensation product of (a) a hydroxyl donor; (b) a cyclic polyhydroxyl acceptor; and (c) an optional catalyst, and (ii) a polyacid, wherein said bio-based, branched polyester resin is greater than about 90% bio-based; or wherein the polymer is a bio-based, branched polyester resin comprising (i) the polycondensation product of (a) glycerine carbonate and/or glycerol; and (b) a rosin acid selected from the group consisting of abietic acid, neoabietic acid, palustric acid, levopimaric acid, dihydroabietic acid, pimaric acid, isopimaric acid and combinations thereof; and (ii) a polyacid selected from the group consisting of succinic acid, fumaric acid, maleic acid, itaconic acid, dodecylsuccinic acid, glutaric acid, adipic acid, pimelic acid, suberic acid and azelaic acid; or wherein the polymer is a branched polyester comprising a compound of the formula:

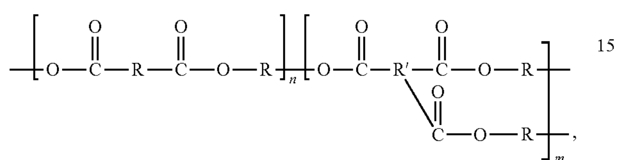

or

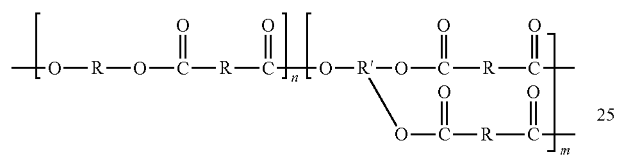

wherein R is an alkylene group, and wherein the alkylene group can be selected from linear and branched, saturated and unsaturated, cyclic and acyclic, and substituted and unsubstituted alkylene groups, and wherein heteroatoms either may or may not be present in the alkylene group;

wherein R' is an alkylene group, and wherein the alkylene group can be selected from linear and branched, saturated and unsaturated, cyclic and acyclic, and substituted and unsubstituted alkylene groups, and wherein heteroatoms either may or may not be present in the alkylene group;

wherein all carbonyl carbons adjacent to R' are separated by at least two atoms if the two atoms are separated by a single bond; or wherein all carbonyl carbons adjacent to R' are separated by at least 3 atoms covalently linked in series;

wherein m is an integer from about 1 to about 1,000; and wherein n is an integer from about 1 to about 1,000; or wherein the polymer monomer units are selected from the group consisting of 1,6-heaxnediol, succinic acid, dimethyl terephthalate, 1,12-dodecanedioic acid, propanediol, isophthalic acid, azelaic acid, isosorbide, and combinations thereof; and optionally, a mordant.

* * * * *